US012694109B2

(12) United States Patent
Frei et al.

(10) Patent No.: US 12,694,109 B2
(45) Date of Patent: Jul. 28, 2026

(54) SYSTEMS AND METHODS FOR DETECTING, LOCALIZING, AND VISUALIZING MANIPULATIONS OF PORTABLE DOCUMENT FORMAT FILES

(71) Applicant: Insurance Services Office, Inc., Jersey City, NJ (US)

(72) Inventors: Matthew D. Frei, Lehi, UT (US); Cherie Ekholm, Redmond, WA (US); Shubhi Singh, Ottawa (CA); Zheng Zhong, Seattle, WA (US); Palak Jain, Draper, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 84 days.

(21) Appl. No.: 18/436,913

(22) Filed: Feb. 8, 2024

(65) Prior Publication Data

US 2024/0265103 A1 Aug. 8, 2024

Related U.S. Application Data

(60) Provisional application No. 63/444,021, filed on Feb. 8, 2023.

(51) Int. Cl.

| | |
|---|---|
| ***G06F 21/56*** | (2013.01) |
| ***G06Q 40/08*** | (2012.01) |
| ***G06V 30/41*** | (2022.01) |

(52) U.S. Cl.

CPC ............ *G06F 21/565* (2013.01); *G06V 30/41* (2022.01); *G06Q 40/08* (2013.01)

(58) Field of Classification Search

CPC ...... G06F 21/565; G06V 30/41; G06Q 40/08; G06Q 30/018

See application file for complete search history.

(56) References Cited

U.S. PATENT DOCUMENTS

| | | | |
|---|---|---|---|
| 6,029,175 A | 2/2000 | Chow et al. |
| 10,169,579 B1 | 1/2019 | Xu et al. |

(Continued)

OTHER PUBLICATIONS

G. Endignoux, O. Levillain and J.-Y. Migeon, "Caradoc: A Pragmatic Approach to PDF Parsing and Validation," 2016 IEEE Security and Privacy Workshops (SPW), San Jose, CA, USA, 2016, pp. 126-139, doi: 10.1109/SPW.2016.39. (Year: 2016).*

International Search Report of the International Searching Authority mailed on May 8, 2024, issued in connection with International Application No. PCT/US24/15036 (6 pages).

(Continued)

*Primary Examiner* — Robert B Leung

(74) *Attorney, Agent, or Firm* — McCarter & English, LLP

(57) ABSTRACT

Systems and methods for detecting and localizing manipulations of portable document format (PDF) files are provided. The system receives one or more PDF files and processes each PDF file using a plurality of check processes. Each check process includes a defined or learned weight that determines that process's level of influence on any document's overall suspicion score, as well as an opinion score for each PDF file based on unique logic and a plurality of factors related to the particular PDF file. The system can generate an overall suspicion score for the PDF file based on the results of the check processes, which can be calculated by aggregating the weight and an opinion score associated with each check process and file. The system can then determine whether the PDF file is a suspicious file using the overall suspicion score.

38 Claims, 27 Drawing Sheets

(56) References Cited

U.S. PATENT DOCUMENTS

| | | | | |
|---|---|---|---|---|
| 2004/0230891 | A1* | 11/2004 | Pravetz | H04L 9/3247<br>715/255 |
| 2008/0177994 | A1* | 7/2008 | Mayer | G06F 16/00<br>709/224 |
| 2017/0293764 | A1* | 10/2017 | Hutton | G06F 21/53 |
| 2018/0285326 | A1* | 10/2018 | Goyal | G06F 40/197 |
| 2020/0211120 | A1* | 7/2020 | Wang | G06N 20/00 |
| 2021/0124919 | A1 | 4/2021 | Balakrishnan et al. | |
| 2023/0274011 | A1* | 8/2023 | Mobley | G06F 21/6209<br>726/30 |
| 2023/0359815 | A1* | 11/2023 | Mayer | G06F 40/137 |
| 2024/0221412 | A1* | 7/2024 | Wells | G06V 30/414 |

OTHER PUBLICATIONS

Written Opinion of the International Searching Authority mailed on May 8, 2024, issued in connection with International Application No. PCT/US24/15036 (8 pages).

Gema Fernandez Bascunana, "Method for Effective PDF Files Manipulation Detection," Master's Thesis, Jan. 1, 2017 (80 pages).

Maiorca, et al., "Digital Investigation of PDF Files: Unveiling Traces of Embedded Malware," arXiv:1707.05102v1, Jul. 17, 2017 (8 pages).

"Forensics," Nov. 16, 2019, https://trailofbits.github.io/ctf/forensics (1 page).

"GitHub—Enferex/pdfresurrect: Analyze and Help Extract Older "Hidden" Versions of a PDF from the Current PDF," https://github.com/enferex/pdfresurrect, retrieved on Apr. 23, 2024 and believed to be publicly available at least as early as Dec. 2022 (3 pages).

* cited by examiner

50

Start

52 — Receive an insurance claim

54 — Extract one or more PDF files associated with the insurance claim

56 — Process a first PDF file of the one or more PDF files using a plurality of check processes, wherein each check process is associated with a weight and a confidence score for the first PDF file 58 — Generate an overall suspicion score for the first PDF file 60 — Determine whether the first PDF file is a suspicious file 61 — Determine Whether Multiple Versions of File Exist 62 — Send a report End

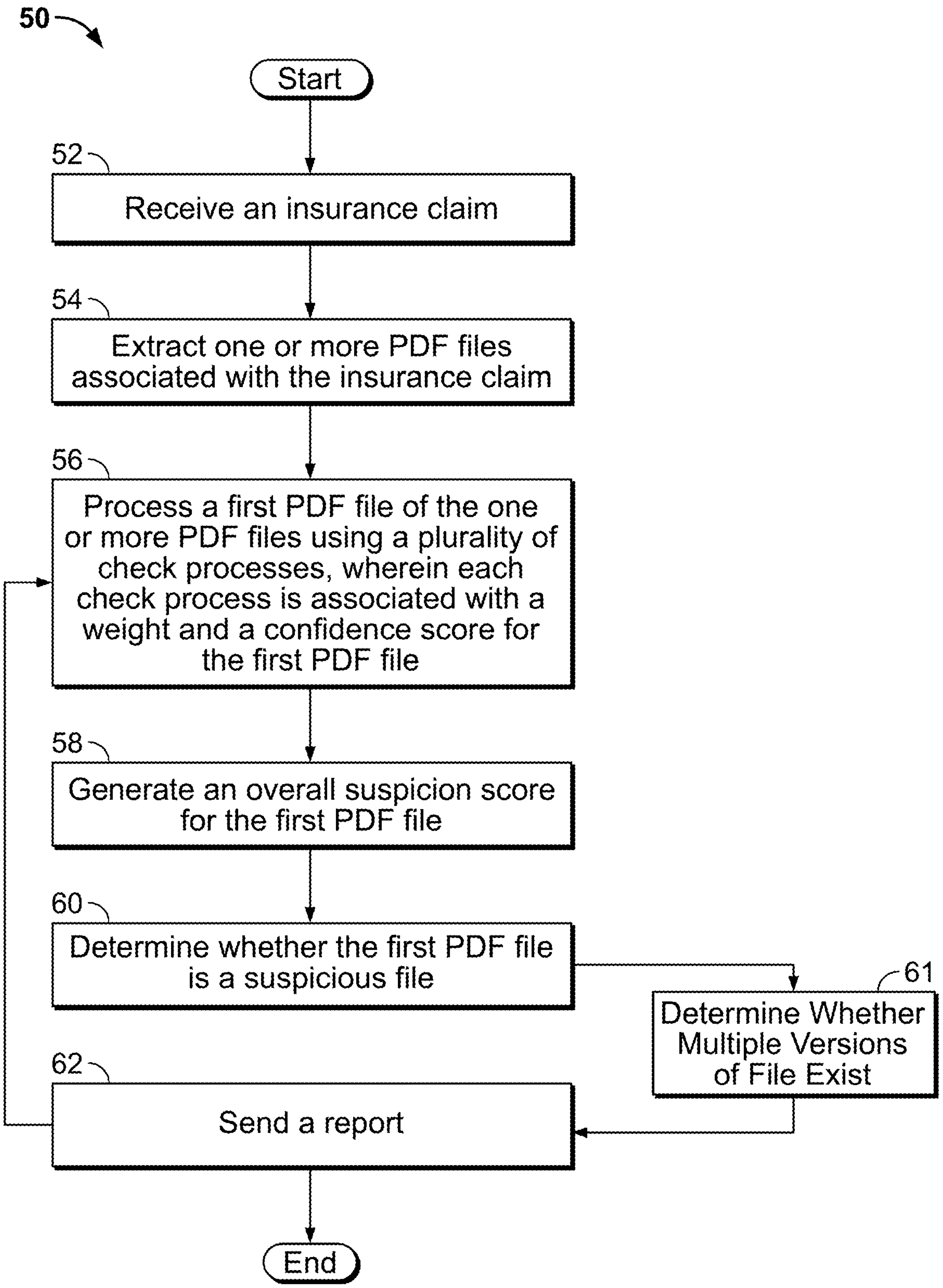

FIG. 3

```
%PDF-1.6
%¢
1 0 obj<</CreationDate (D:20220318142943-07'00')/ModDate(D:20220318145057-07'00')/Author
(I34921)/Creator(Bluebean Revu x64)/Producer(Bluebeam PDF Library 20)>
endobj
2 0 obj<</Type/Catalog/Pages 3 0 R/Version/1.6>>
endobj
3 0 obj<</Type/Pages/Kids [21 0 R]/Count 1>>
endobj
4 0 obj<</Parent 21 0 R/Contents 19 0 R/BleedBox[0 0 612 792]/ArtBox[0 0 612 792]/MediaBox
[0 0 612 792]/TrimBox[0 0 612 792]/Resources<</ExtGState<</GS0 18 0
R/Contents 19 0 R/Bl
5 0 obj<</Color [65535 26214 0]/Dimmed false/Editable false/Preview true/Printed true/Title
(fpo - guides)/Visible true>>
endobj
6 0 obj<</Color [65535 20224 20224]/Dimmed false/Editable true/Preview true/Printed true/Title
(artwork)/Visible true>>
endobj
7 0 obj<</BaseFont/YYEPKE+Calibri/Encoding/WinAnsiEncoding/FirstChar 32/FontDescriptor 8 0
R/LastChar 121/Subtype/TrueType/Type/Font/Widths [226 0 0 498 0 0 0
endobj
```

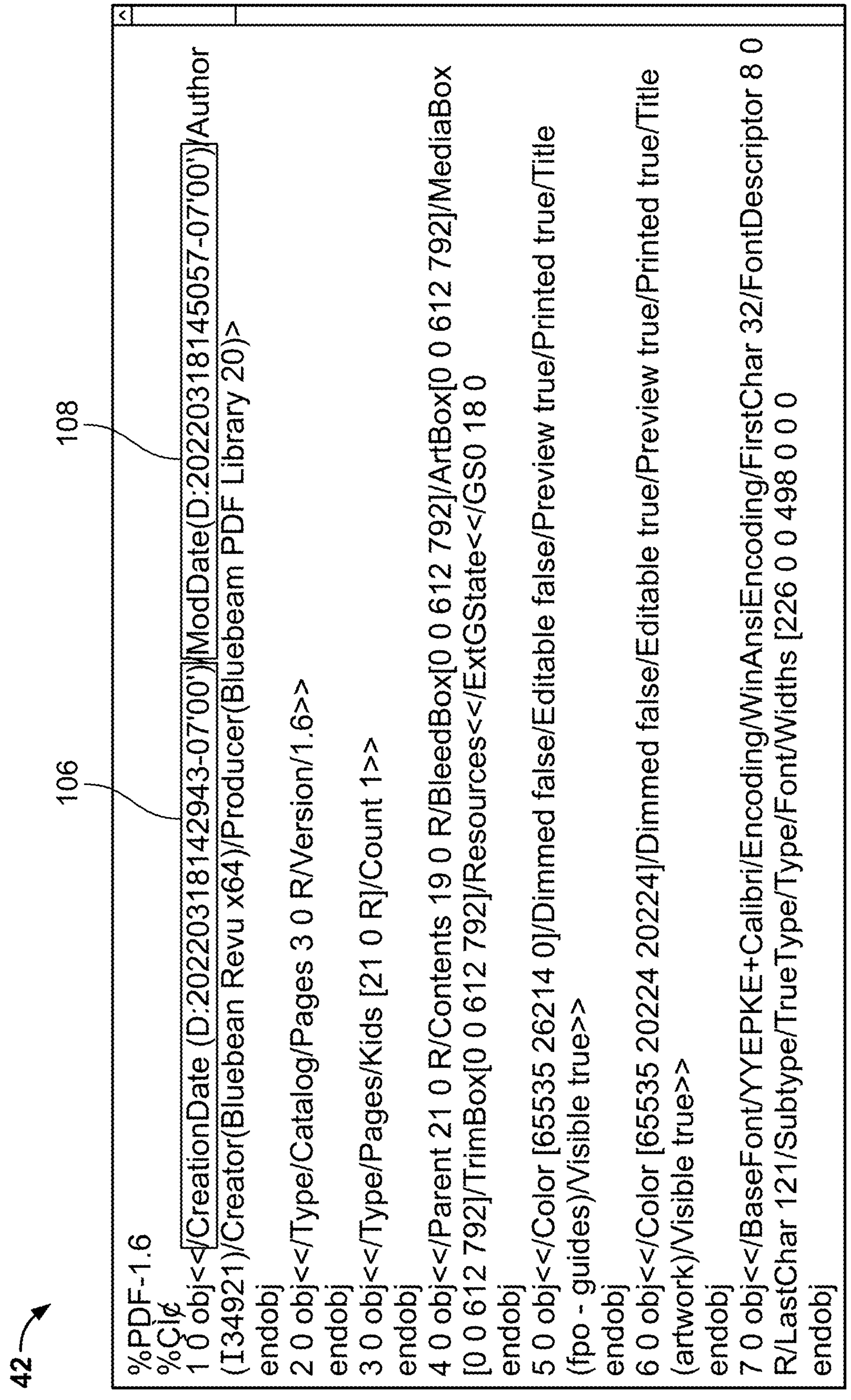

FIG. 5B

Signature Check

120

92 — Single File from Claim

122 — DigSig Check

124 — Is Signed

Yes

No

126 — Which Filter Type Used?

128 — Scoring

130 — Report

132 — Next Check

48A trailer<</Size 44/Info 1 0 R/ID[<e6ece28c9a0440778ba015a4cd71b6d3><e6ece28c9a0440778ba015a4cd71b6d3>]
/Root 2 0 R>>
startxref
55366
%%EOF 212A     210A     212B

48B

5 0 obj
<</DecodeParms<</Columns 4/Predictor 12>>/Filter/FlateDecode/ID[<C7330A233C9969408F5231AC1211ABB7>
<65D6A622F8A86D4FB9C2D5E9842AD4CB>]/Info 10 0 R/Length 48
hPbb &Æik↑L↑Œwɇ□ïʊ□<<H0Ü□J    X↑Œ0,é'd □0 ¿÷□
endstream
endobj
startxref
116
%%EOF 212D     212C     210B

600

Start

602 — Receive PDF File

604 — Process PDF File Using Rules-Based PDF Checks

608 — Find Areas of Overlap

610 — Apply Highlight That Merges Bounding Box of Each Object in Each Overlapping Area 612 — Identify Layers 616 — Create Document Mockup With Overlaps Identified and Original Text or Image Highlighted 618 — Include Overlap Location Coordinates in Output Generated Alongside File End

620

Start

622 — Determine Whether File Was Saved Using Incremental or Full Save

624 — For Incremental Saves, Read File Trailer to Find Cross-Reference Table or Stream 626 — Use Cross-Reference Table or Stream to Locate All Objects in Document 628 — Use Generation Information of Each Object to Determine Which Object(s) Contain Changes from Original File 630 — Regenerate a PDF File Corresponding to Each Generation Included in the File and Add Highlight to Each Change 632 — Include Location Coordinate for Each Change in Files End

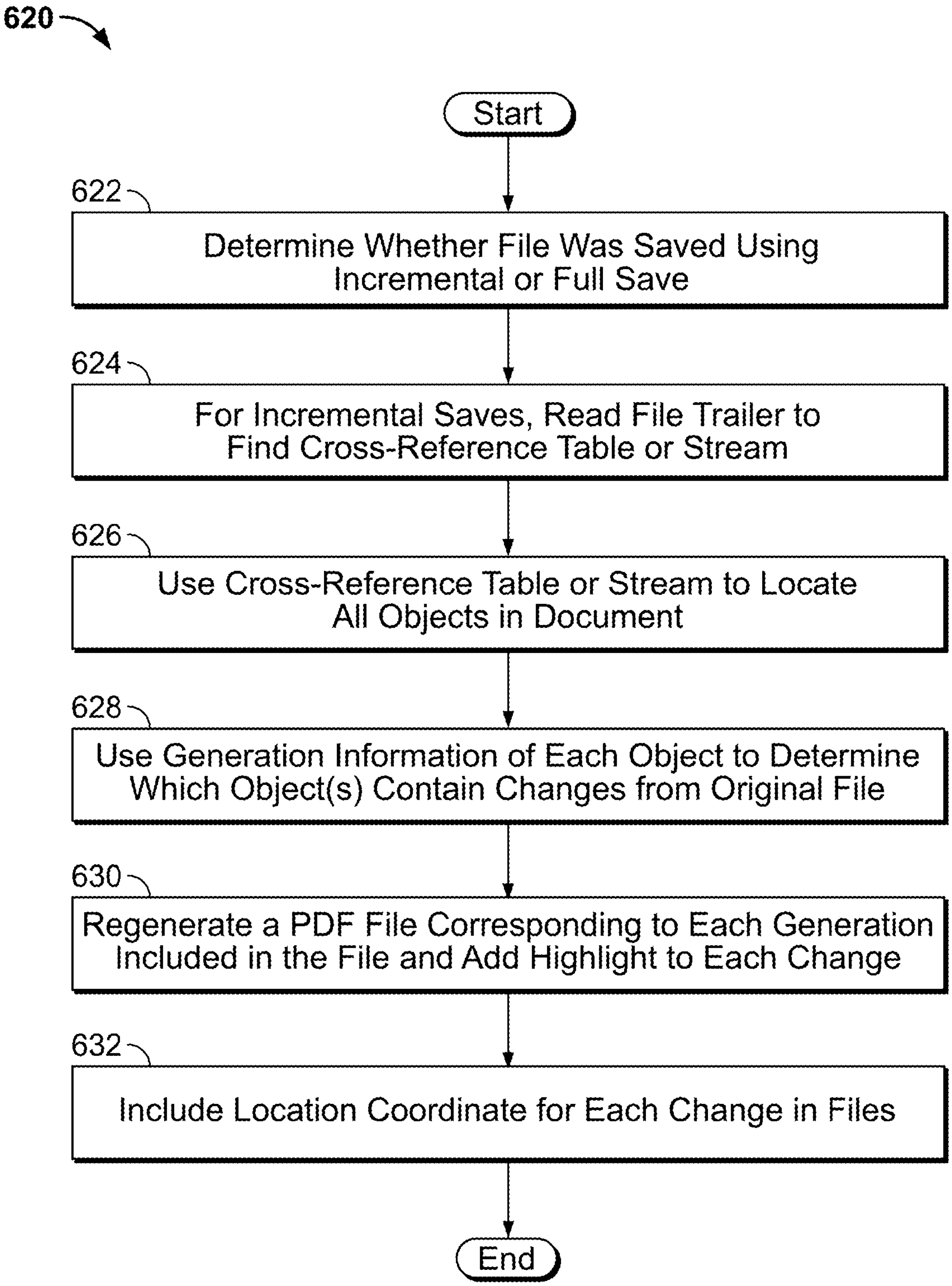

Sales Receipt

PDF Landscaping
Whatever you want

Date: January 10, 2023
Invoice #: 3294-2

Sold to:

| Payment Method | Check No. | Job |
|---|---|---|
| Check | 5432 | 979374-12-121 |

| Qty | Item # | Description | Unit Price | Discount | Line Total |
|---|---|---|---|---|---|
| 2 | 234 | Rocks | $ 45.00 | $ 5.00 | $ 85.00 |
| 45 | 3232 | Bricks | 15.00 | $ 29.00 | 646.00 |
| 6 | 232 | Shovel | 45.32 | | 271.92 |

FIG. 19

PDF Landscaping
Whatever you want

Sales Receipt

Date: January 10, 2023
Invoice #: 3294-2

Sold to: Peter Pan
Neverland, Inc
1234 N Wendy Ave
Neverland, CA 90322
345-555-1212

| Payment Method | Check No. | Job |
| --- | --- | --- |
| Check | 5432 | 979374-12-121 |

| Qty | Item # | Description | Unit Price | Discount | Line Total |
| --- | --- | --- | --- | --- | --- |
| 2 | 234 | Rocks | $ 45.00 | $ 5.00 | $ 85.00 |
| 45 | 3232 | Bricks | 15.00 | 29.00 | 646.00 |
| 6 | 232 | Shovel | 45.32 | | 271.92 |

642

644

| 🖼️ | | Submitted | | **Sales Receipt** |
|---|---|---|---|---|

PDF Landscaping
Whatever you want

Date: January 10, 2023
Invoice #: 3294-2

Sold to:

| Payment Method | Check No. | Job |
|---|---|---|
| Check | 5432 | 979374-12-121 |

| Qty | Item # | Description | Unit Price | Discount | Line Total |
|---|---|---|---|---|---|
| 2 | 234 | Rocks | $ 45.00 | $ 5.00 | $ 85.00 |
| 45 | 3232 | Bricks | 15.00 | $ 29.00 | 646.00 |
| 6 | 232 | Shovel | 45.32 | | 271.92 |

| 🖼️ | | Edit Found | | **Sales Receipt** |
|---|---|---|---|---|

PDF Landscaping
Whatever you want

Date: January 10, 2023
Invoice #: 3294-2

Sold to:
Peter Pan
Neverland, Inc
1234 N Wendy Ave
Neverland, CA 90322
345-555-1212

| Payment Method | Check No. | Job |
|---|---|---|
| Check | 5432 | 979374-12-121 |

| Qty | Item # | Description | Unit Price | Discount | Line Total |
|---|---|---|---|---|---|
| 2 | 234 | Rocks | $ 45.00 | $ 5.00 | $ 85.00 |
| 45 | 3232 | Bricks | 15.00 | $ 29.00 | 646.00 |
| 6 | 232 | Shovel | 45.32 | | 271.92 |

Obscured text found

Coordinates: XXXX

Hidden text:

Peter Pan
Neverland, Inc
1235 N Wendy Ave
Neverland, CA 90533
345-555-1212

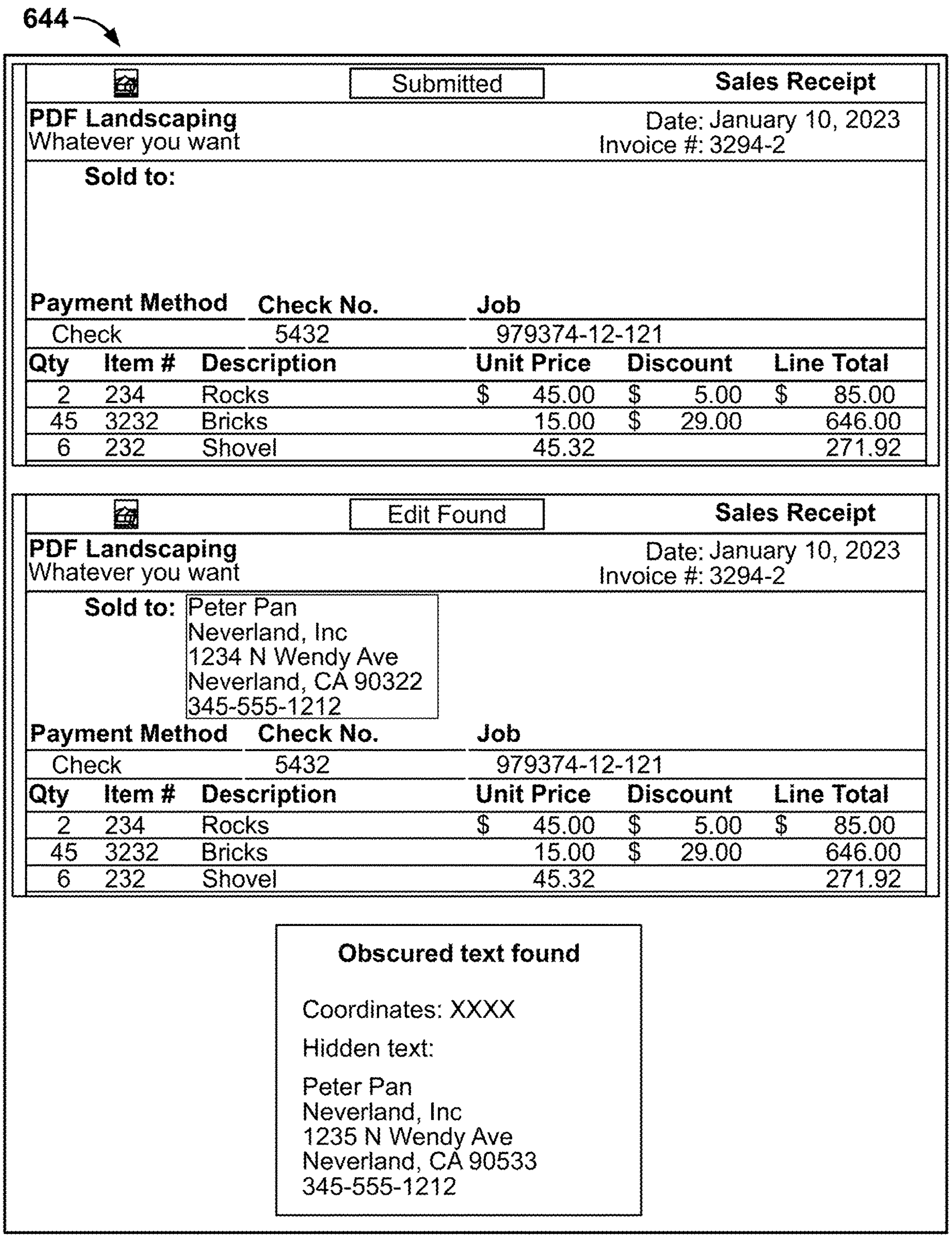

Sales Receipt

PDF Landscaping
Whatever you want

Date: January 10, 2023
Invoice #: 329

Sold to: Charlie Brown
157 Football Way
Peanuts, IA 22201
236-555-3232

| Payment Method | Check No. | Job |
|---|---|---|
| Check | 5432 | 979374-12-121 |

| Qty | Item # | Description | Unit Price | Discount | Line Total |
|---|---|---|---|---|---|
| 2 | 234 | Rocks | $ 45.00 | $ 5.00 | $ 85.00 |
| 45 | 3232 | Bricks | 15.00 | $ 29.00 | 646.00 |
| 6 | 232 | Shovel | 45.32 | | 271.92 |

Sales Receipt

PDF Landscaping
Whatever you want

Date: January 10, 2023
Invoice #: 329

Sold to: Peter Pan
Neverland, Inc
1234 N Wendy Ave
Neverland, CA 90322
345-555-1212

| Payment Method | Check No. | Job |
|---|---|---|
| Check | 5432 | 979374-12-121 |

| Qty | Item # | Description | Unit Price | Discount | Line Total |
|---|---|---|---|---|---|
| 2 | 234 | Rocks | $ 45.00 | $ 5.00 | $ 85.00 |
| 45 | 3232 | Bricks | 15.00 | $ 29.00 | 646.00 |
| 6 | 232 | Shovel | 45.32 | | 271.92 |

Sales Receipt

PDF Landscaping
Whatever you want

Date: January 10, 2023
Invoice #: 3294-2

Sold to: Peter Pan
Neverland, Inc
1234 N Wendy Ave
Neverland, CA 90322
345-555-1212

| Payment Method | Check No. | Job |
|---|---|---|
| Check | 5432 | 979374-12-121 |

| Qty | Item # | Description | Unit Price | Discount | Line Total |
|---|---|---|---|---|---|
| 2 | 234 | Rocks | $ 45.00 | $ 5.00 | $ 85.00 |
| 45 | 3232 | Bricks | 15.00 | $ 29.00 | 646.00 |
| 6 | 232 | Shovel | 45.32 | | 271.92 |

FIG. 23

SYSTEMS AND METHODS FOR DETECTING, LOCALIZING, AND VISUALIZING MANIPULATIONS OF PORTABLE DOCUMENT FORMAT FILES

RELATED APPLICATIONS

This application claims the priority of U.S. Provisional Application Ser. No. 63/444,021 filed on Feb. 8, 2023, the entire disclosure of which is expressly incorporated herein by reference.

BACKGROUND

Technical Field

The present disclosure relates generally to the field of digital document verification. More specifically, the present disclosure relates to systems and methods for detecting manipulations of portable document format files.

Related Art

Portable document format (PDF) files are widely used in the computing field. For example, many documents are saved as PDF format and shared with other user (e.g., through e-mail attachments, as website downloads, etc.). While the PDF format has features designed to protect the contents of the files and contains features that may aid in certifying authenticity, these features are optional and not widely used. Moreover, PDF files are generally based on standard specifications that are not strictly followed by many companies. Thus, PDF files have a great risk of fraud and/or manipulation, which presents a significant security risk. Accordingly, what would be desirable are systems and methods for detecting manipulations of portable document format files, which address the foregoing, and other, needs.

SUMMARY

The present disclosure relates to systems and methods for detecting manipulations of portable document format (PDF) files. The system receives one or more PDF files and processes each PDF file using a plurality of check processes. Each check process includes a defined weight that determines that process's level of influence on any document's overall suspicion score. Each check also produces an opinion score for each PDF file based on unique logic and a plurality of factors related to the particular PDF file. The check processes can include, but are not limited to: a date range check process, a signature check process, an encryption check process, a blocklist check process, an end-of-file (EOF)/identifier (ID) check process, a creation/modification date check process, a creator/producer check process, an obscured-object check process, a font check process, a tagged check process, a PDF version matching check process, a document duplication check, an artificial intelligence (AI)-based anomaly detection process, a classification of document types and comparison against known authentic documents of the same type, or other suitable check processes. The system can generate an overall suspicion score for the PDF file based on the results of the check processes. The overall suspicion score can be calculated by aggregating the weight and an opinion score associated with each check process and file. The system can then determine whether the PDF file is a suspicious file using the overall suspicion score. The system can generate a report in human-readable (HTML, PDF, etc.) or machine-readable formats (JSON, XML, etc.), indicating that the PDF file is a suspicious file and send the report to one or more desired recipients or as an application programming interface (API) call response.

BRIEF DESCRIPTION OF THE DRAWINGS

The foregoing features of the invention will be apparent from the following Detailed Description of the Invention, taken in connection with the accompanying drawings, in which:

FIGS. 3-4 are flowcharts illustrating overall processing steps carried out by the system of the present disclosure;

FIG. 5B is a diagram showing a PDF header of a PDF file displayed in a text editor;

FIG. 18 is a flowchart illustrating processing steps for displaying multiple versions of a PDF file;

FIGS. 19-21 are screenshots illustrating localization and display by the system of edits to PDF files;

FIG. 23 illustrates localization by the system of edits across multiple versions of a PDF file.

DETAILED DESCRIPTION

The present disclosure relates to systems and methods for detecting manipulations of portable document format files, as described in detail below in connection with FIGS. 1-22.

Figure 1:
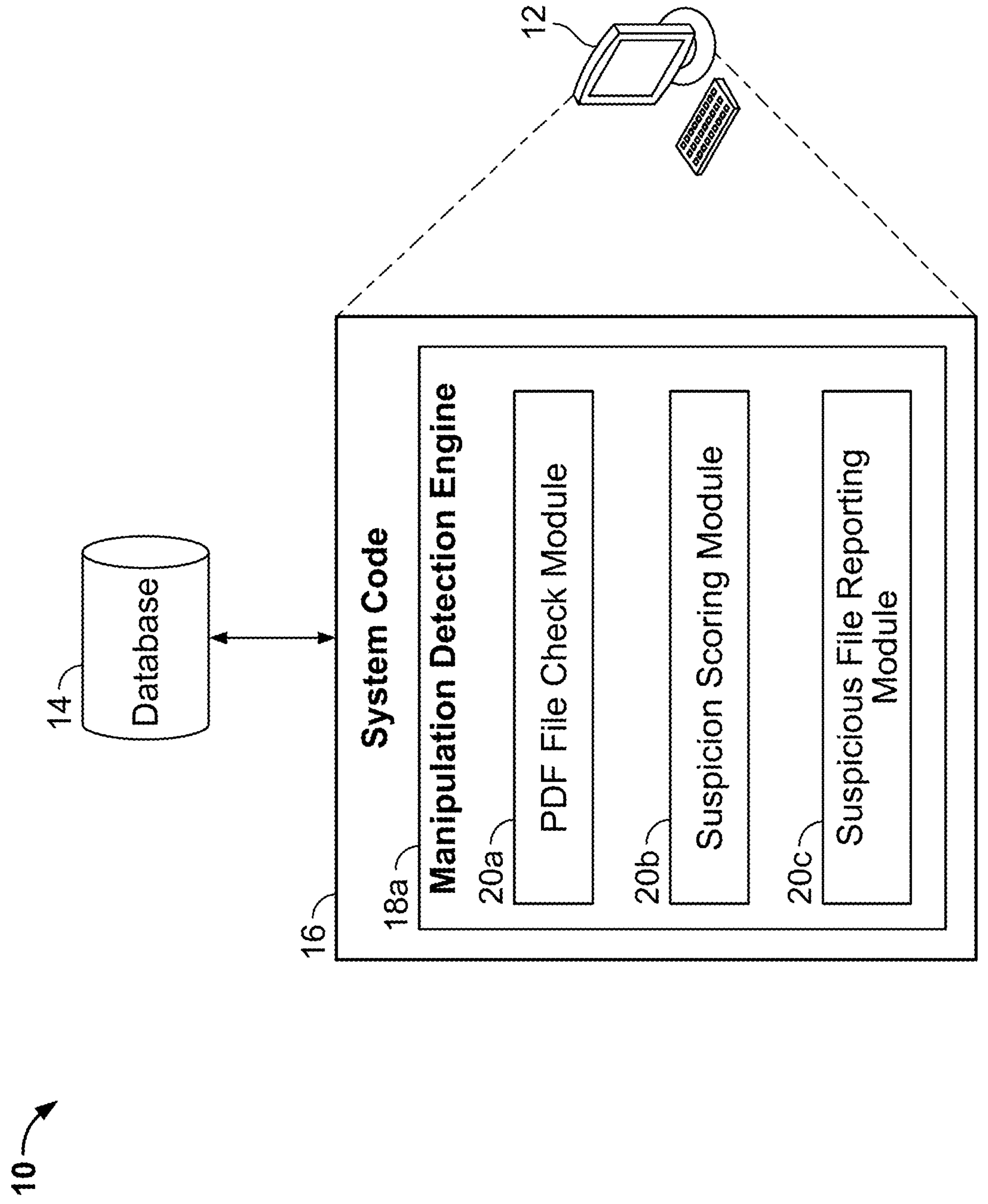
FIG. 1 is a diagram illustrating an embodiment of the system of the present disclosure.

Turning to the drawings, FIG. 1 is a diagram illustrating an embodiment of the system 10 of the present disclosure. The system 10 can be embodied as a central processing unit 12 (processor) in communication with a database 14. The processor 12 can include, but is not limited to, a computer system, a server, a personal computer, a cloud computing device, a smart phone, or any other suitable device programmed to carry out the processes disclosed herein. Still further, the system 10 can be embodied as a customized hardware component such as a field-programmable gate array ("FPGA"), an application-specific integrated circuit ("ASIC"), graphics processing unit (GPU), embedded system, or other customized hardware components without departing from the spirit or scope of the present disclosure. It should be understood that FIG. 1 is only one potential configuration, and the system 10 of the present disclosure can be implemented using a number of different configurations.

The database 14 includes PDF files to be processed by the systems/methods of the present disclosure, as well as opinion scores and weights for various checking processes and associated data, including, but not limited to: lookup tables, historical opinion scores and weights, and rules for determining (e.g., calculating, adjusting, searching, or the like) opinion scores and weights; overall suspicion scores and associated data, including, but not limited to: lookup tables, historical overall suspicion scores, and rules for determining (e.g., calculating, adjusting, or the like) overall suspicion scores; suspicious files and associated data (e.g., opinion scores, weights, overall suspicion scores, rules, or the like); and ground truth files and associated data, or the like. The database 14 can further include PDF files from internal and external sources (e.g., PDF files generated by one or more software programs/platforms, such as Visualized ClaimSearch, Xactimate, XactAnalysis, ClaimXperience, PropertyPres Wizard, Adobe Acrobat, Microsoft Office, iText, various PDF printer drivers, or other suitable sources). The database 14 can further include one or more outputs from various components of the system 10 (e.g., outputs from a manipulation detection engine 18*a*, a PDF file check module 20*a*, a suspicion scoring module 20*b*, a suspicious file reporting module 20*c*, and/or other components of the system 10).

It is noted that the systems/methods of the present disclosure can be utilized with PDF files generated in a wide variety of business, technical, educational, or other applications. For example, the systems/methods disclosed herein can be utilized in connection with verifying the integrity of insurance claims transmitted/stored as PDF files, as well as in connection with property and automobile inspections for underwriting purposes. An insurance claim can refer to a request to an insurance company for payment after a policyholder experiences a loss covered by their policy. For example, if a home is damaged by a fire and the homeowner has insurance, the homeowner will file a claim to begin the process of the insurance company paying for the repair. Of course, other types of PDF files generated in other circumstances/industries/professions could easily be utilized in connection with the systems/methods of the present disclosure. Additionally, one or more PDFs can be processed by the systems/methods of the present disclosure in batch mode, e.g., by submission and processing of a "job" that includes any group or bundle of PDF documents.

Figure 2C:
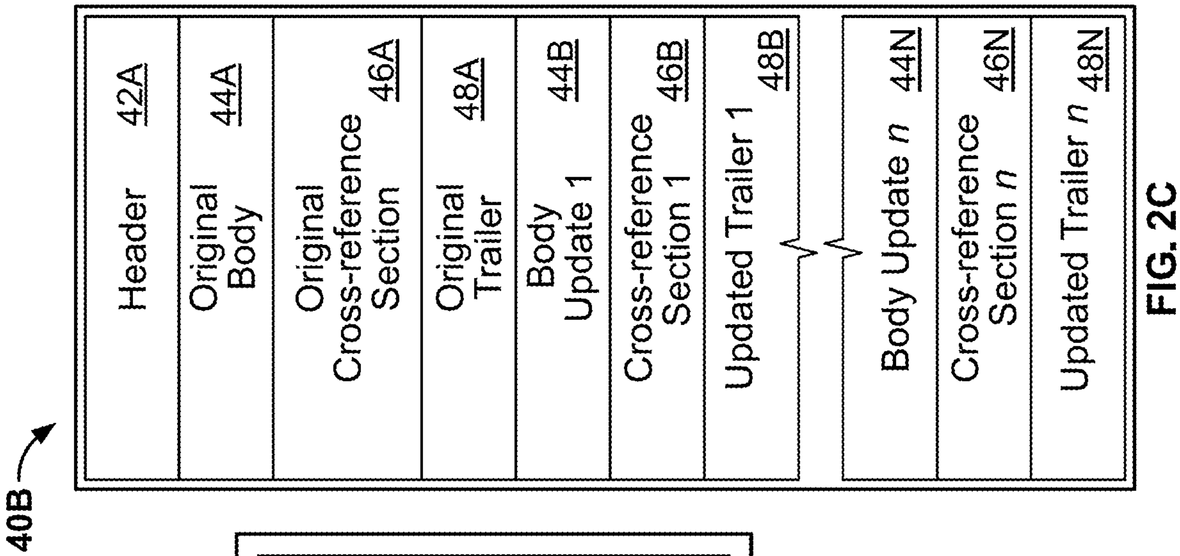
FIG. 2C is a diagram illustrating an updated structure of a PDF file known in the art.
Figure 2B:
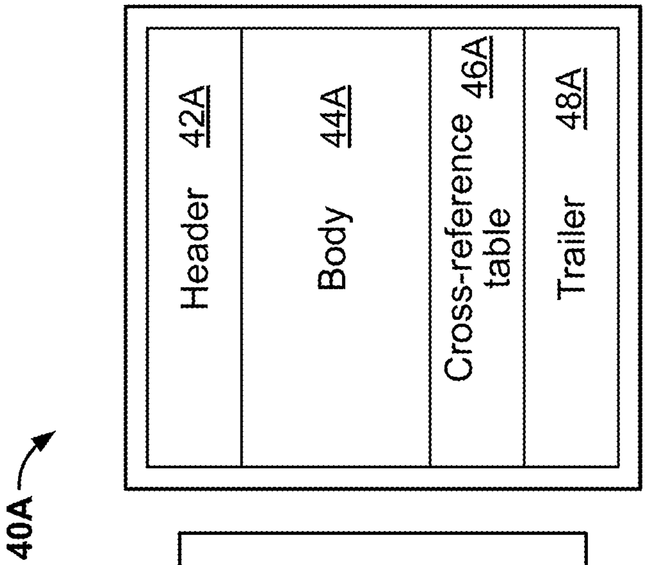
FIG. 2B is a diagram illustrating a known PDF file structure.
Figure 2A:
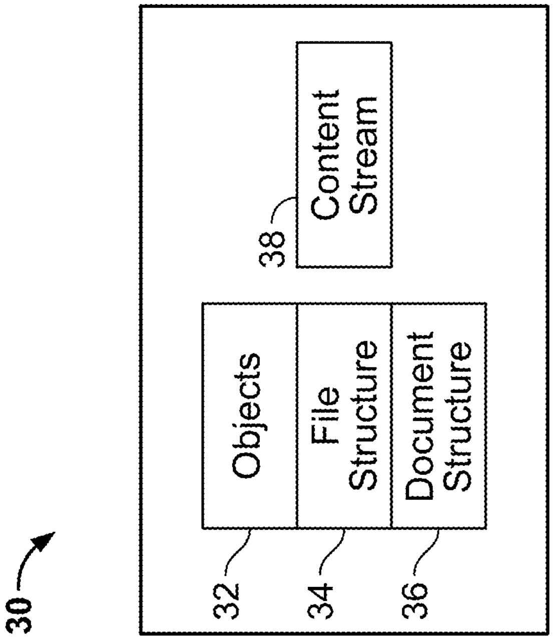
FIG. 2A is diagram illustrating prior art PDF file components.

Reference is now made to FIGS. 2A-2C, which are diagrams illustrating the structure of known (prior art) PDF files, which is helpful in understanding the functionality and improvements brought about by the systems/methods of the present disclosure. A PDF refers to the format of a file. The technical specification of PDF files is described in the ISO 32000 standard. A PDF file can be represented as an 8-bit binary file or a 7-bit ASCII text file. The bytes in a PDF file can represent: objects 32, a file structure 34, a document structure 36 and a content stream, 38 as shown in FIG. 2A which is diagram illustrating PDF components 30. The file structure 34 can specify how the objects 32 are saved in the file, and how to access them. The document structure 36 can define how the objects are used to determine components, where the components are pages, fonts, annotations, and so forth. The content stream 38 is formed by a sequence of instructions describing the appearance of a page or a graphic. All other basic elements are objects 32.

As shown in FIG. 2B (which is a diagram illustrating a structure of a PDF file 40A, the PDF file 40A can include a header 42A, a body 44A, a cross-reference table 46A, and a trailer 48A. The header 42A must be the first line, where the version of the PDF is specified. The body 44A can contain all objects 32 used to reproduce the document, and the cross-reference table 46A can contain information about indirect objects 32 in the PDF file 40A, allowing the access to random objects 32 without needing to read the entire file. The trailer 48A can contain information about the location of the cross-reference table 46A and about special objects 32 within the body 44A of the PDF file 40A. Examples of headers and trailers are described with respect to FIGS. 5B and 9B.

This file organization can be changed due to some modifications in the original file by incremental updates to the file. For example, as shown in FIG. 2C (which is a diagram illustrating an updated structure of a PDF file 40B), a body with a $1^{st}$ update 44B, a cross-reference table with a $1^{st}$ update 46B, and a trailer with a $1^{st}$ update 48B are inserted at the end of the original components (e.g., after the body 44A, the cross-reference table 46A, and the trailer 48A). Subsequent updates (e.g., a body with a $n^{th}$ update 44N, a cross-reference table with a $n^{th}$ update 46N, and a trailer with a $n^{th}$ update 48N) are inserted at the end of the previous updates.

The system 10 includes system code 16 (non-transitory, computer-readable instructions) stored on a computer-readable medium and executable by the hardware processor 12 or one or more computer systems. The system code 16 can include various custom-written software modules that carry out the steps/processes discussed herein, and can include, but is not limited to, the manipulation detection engine 18*a*, the PDF file check module 20*a*, the suspicion scoring module 20*b*, the suspicious file reporting module 20*c*, and/or other components of the system 10. The system code 16 can be programmed using any suitable programming languages including, but not limited to, C, C++, C #, Java, JavaScript, Python, or any other suitable programming language. Additionally, the system code 16 can be distributed across multiple computer systems in communication with each other over a communications network, and/or stored and executed on a cloud computing platform and remotely accessed by a computer system in communication with the cloud platform. The system code 16 can communicate with the database 14, which can be stored on the same computer system as the system code 16, or on one or more other computer systems in communication with the system code 16.

FIG. 3 is a flowchart illustrating overall processing steps 50 carried out by the system 10 of the present disclosure. Beginning in step 52, the system 10 receives a PDF file for processing, which could be obtained as a single file, as a collection of files (e.g., in a job), or as a continuous stream of files, in real time. The system 10 can receive the PDF file from a user input, the database 14, a software program/platform (e.g., Xactimate, XactAnalysis, ClaimXperience, PropertyPres Wizard, Adobe Acrobat, Microsoft Office, iText, various PDF printer drivers, or the like) or an external source (e.g., third-party systems, external databases or the like).

In step 54, the system 10 extracts one or more PDF files (e.g., a PDF file associated with a job). For example, the manipulation detection engine 18*a* can extract multiple PDF files associated with the insurance claim (e.g., receipts, evaluation reports, and/or any other suitable PDF files).

In step 56, the system 10 processes a first PDF file of the one or more PDF files using a plurality of check processes. Each check process is associated with a weight and an opinion score for the first PDF file. For example, the PDF file check module 20*a* can process the PDF file using multiple check processes including, but not limited to: a claim data check process, a signature check process, an encryption check process, a blocklist check process, an end of file (EOF)/identifier (ID) check process, a creation/modification date check process, a creator/producer check process, an obscured-object check process, a font check process, a tagged check process, a PDF version matching check process, or other suitable check process for PDF files, as further described below (e.g., a document duplication check, an artificial intelligence (AI)-based anomaly detection process, a classification of document types and comparison against known authentic documents of the same type, or other suitable check processes).

The claim data (or, filing date) check process can validate that a date indicated in a PDF file (e.g., docinfo:createdate) falls within a chosen date range. A date range can be determined by user inputs, such as two inputs StartDate and EndDate to indicate a range of dates valid for a given PDF document or set of PDF documents. Default dates for both can be current dates or other suitable dates set by users. Examples are described with respect to FIGS. 5A and 5B.

The digital signature check process can determine and identify changes to electronic signatures. For instance, a PDF file from a contractor detailing final costs, project changes, any items out of scope, etc., can be issued at the end of a large restoration or rebuilding project. The PDF file can be electronically signed by one or more parties. The digital signature check process can determine whether signatures in a PDF file are valid per ISO 32000 requirements, which filters were used and determine whether any changes have been made to the PDF file after the signatures are created. If both the originating entity and the signer have signed the PDF file, the PDF file is highly likely to be reliable/trusted. The digital signature check process can be also applied to a PDF file having only one signer or more than two signers. For example, the rules that apply to two signers described herein can also apply to one signer or more than two signers. The signature check process can be used in conjunction with other check processes, such as an end-of-file (EOF) check process. If there is only one EOF for a PDF file and no changes are made to the signatures, the signature check process can determine an opinion score for that PDF file indicating that the PDF file has been unaltered after signing. Examples are described with respect to FIGS. 6A and 6B.

The encryption check process can identify an encryption key in a PDF file trailer (e.g., the trailer 48A in FIG. 2B) to determine whether the PDF file is encrypted or not. As with valid, verifiable signatures, encryption is often the last step before archiving or otherwise storing a PDF file. If a PDF file has been encrypted, the encryption check process can determine that a likelihood is very high that the PDF file is unaltered by a claimant. The encryption check process can be updated based on the security technical reports/specifications specified in the ISO 32000 standard. Examples are described with respect to FIG. 7.

The blocklist check process can identify a producer and/or editor of a PDF file and determine whether the producer or editor are suspicious by comparing the producer and/or editor with a list of suspect editors or editor attributes (e.g., free, online editors, editors having manipulation records, editors not usually employed to create similar professionally oriented files, or the like). Examples are described with respect to FIG. 8.

The EOF/ID check process can identify trailer(s) and ID(s) in a PDF file and determine whether the PDF file has been changed using the identified trailer(s) and ID(s). For example, the EOF/ID check process can identify the trailer(s) (e.g., the trailers 48A-48N in FIG. 2C) to determine whether there has been one save or multiple saves of the PDF file. PDF files that have been saved multiple times without a "Save As" action have multiple EOF marks, two UUIDs, and an incremented "Prev" key. Any PDF file that has been saved only one time, or that has had a "Save As" action performed as the most recent save action, has only one EOF and either no "Prev" key or no incrementing of the "Prev" key. PDF files can also be assigned a universally unique identifier (UUID) upon a file save action, which is stored in the ID key in the trailer. If the PDF file has been saved more than once, the EOF/ID check process can identify the ID plus an updated ID for the modifications in the trailer. Some files store the UUID twice in the trailer on a first save to PDF. In that case, the two UUIDs are identical, indicating that the PDF file has not been modified. If the two UUIDs are different, the EOF/ID check process can determine that the PDF file has been modified. Examples are described with respect to FIGS. 9A-9E.

The creation/modification date check process can identify a creation date and a modification date of a PDF file. These dates can be listed in the PDF file in two ways: in the document information and the metadata stream of the PDF file. Examples are described with respect to FIG. 10.

The creator/producer check process can identify a producer and creator of a PDF file. The producer can indicate a driver or application that generated the PDF file. The creator can indicate the application that was used to create a format (e.g., formats rather PDF, and/or PDF) that was then subsequently saved as PDF. For instance, in a PDF file created in Microsoft Word, the producer and creator can most commonly be Microsoft Word for both. If a PDF file was created in Microsoft Word and then saved to PDF via Print to PDF, the producer can be Microsoft Print Driver and the creator can be Microsoft Word. Examples are described with respect to FIG. 11.

The obscured-object check process can identify obscured objects and layers containing obscured objects in a PDF file and determine whether obscured objects and/or layers have obscured texts. For example, someone may "white out" some information on the page, such as name and address of the purchaser. The obscured-object check process can identify how objects on a page are placed relative to one another on a page. Changes to the document that hide or obscure original text or other objects can be suspicious. Examples are described with respect to FIG. 12.

The font check process can identify font(s) in a PDF file and determine whether the PDF file has been changed based on the font(s). In a PDF file where the fonts have been subset, the font check process can identify glyphs that are not associated with the same font as the surrounding text in the document. Subset fonts contain only the glyphs used in the original document. Additional glyphs can be added after the initial editing, but a PDF reader will have to substitute an available font for them. The font check process can also identify glyphs that are not contained within a character mapping. The font check process can also identify possible edits by enumerating the fonts in the PDF file, grouping them into font families, and checking for the use of too many font families (generally a document contains no more than 3-4 font families). The font check process can also identify the name, size and weight of the font in the surrounding text to ensure matches. The font check process can verify font attributes with known good fonts. Examples are described with respect to FIG. 13.

The tagged check process can determine whether a PDF file is tagged. A tagged PDF file includes markup to indicate the relationships among various PDF objects, the logical structure of the document, or semantic meaning of some structures. This markup is generally utilized for accessibility, and as a result, its use for document verification is novel. The tagged check process can identify a marked key in a PDF file and determine whether the PDF file has markup. The logical structure is stored separately from the visual content, with pointers from one to the other. The marked key in the marked contents dictionary indicates whether the PDF file has had markup applied. If a tagged document has been changed, some markup can be missing from the document (e.g., typically, a genuine file should be either fully marked up or not marked up at all, and the systems/methods of the present disclosure can flag partial and/or missing markups). Examples are described with respect to FIG. 14.

The PDF version matching check process can identify a PDF version used in a PDF file and determine whether the PDF version has been changed. In a valid PDF file, the file version must be declared in the header. If a change is made, there is an option to update the header via a key in the document catalog. That key overrides the header information. If there is a discrepancy, the PDF file may have been edited. The version key can be also updated if the version has been changed. The PDF version matching check process can check both locations (e.g., document catalog, a location where the version key is located) to determine whether the PDF version has been changed.

The system 10 (e.g., the PDF file check module 20*a*) can also perform a Dublin Core (DC) check process that can identify DC metadata in a PDF file and determine whether the PDF has been changed. If a PDF file contains a metadata stream and that stream includes DC metadata, comparisons with the producer of the PDF file can, in some cases, show whether the PDF file has been altered. For example, when a Word file is opened in Adobe Acrobat and a change is made, then the file is saved. Word includes one item of DC metadata by default and Adobe adds a second item to the DC XMP list.

The system 10 (e.g., the PDF file check module 20*a*) can also perform a comparison process (e.g., numeric comparison, alphabetic comparison, alphanumeric comparison, etc.), that can calculate content on a given PDF file. For example, this process can calculate total, tax, and amounts of items, and compare the calculated values with the values provided by the PDF file for accuracy checking. This process can also verify the costs of items in the PDF file against local area costs, online shop costs, or other relevant comparisons.

The system 10 (e.g., the PDF file check module 20*a*) can also perform a document reconstruction to reconstruct previous versions of a PDF file using EOF, UUID/Prev keys, object cross reference tables, and/or trailers identified by the EOF/ID check process as described above. For example, the PDF file check module 20*a* can identify all the trailers (present or previous trailers) and Prev keys in an incrementally saved file, and can trace the relationships between current and previous objects referenced in the cross-reference tables. The PDF file check module 20*a* can then display an approximation of a previous version of a PDF file based on objects no longer being used in the file. The PDF file check module 20*a* can also trace cross-reference table backwards to reconstruct earlier versions of the PDF file, if any, until the original base PDF file is reached.

The system 10 (e.g., the PDF file check module 20*a*) can also perform a linearized PDF file check process because linearized pdfs are different in some important ways that impact some of the checks (See, e.g., EOF check described in connection with FIG. 9A), a metadata check process to check if PDF files has no metadata, and an XObject check process. The PDF file check module 20*a* can create a blocklist of encryption methods (e.g., using ISO 32000-2 and the subsequent technical specifications for security), a list of valid producer/creator pairs, valid producer/DC Core pair information, a blocklist of producers and creators, or the like. The PDF file check module 20*a* can use these blocklists for checking PDF files.

Each check process is associated with a weight and an opinion score for a PDF file. A weight indicates an impact given by evidence provided by a particular check process upon determining whether a PDF has been manipulated. A weight is a static value that can be set using predetermined values, set by users, set by the system 10, or set using a training process in which ground truth data and labeled data are used to minimize a deviation between an output value and an expected value, resulting in suitable weights. A weight can be set in a range from 0 to 1 (inclusive). “1” can indicate a high likelihood that a PDF file has been manipulated/altered/modified.

A weight does not vary from one PDF file to another—only from one check process to another. For example, the digital signature check process may have a weight of 0.9. That value is close to the max value (1), indicating that presence of a valid digital signature in a PDF file has a very large impact on the likelihood that it was manipulated. However, the creation/modification date check process may have a somewhat lower weight—perhaps about 0.5. This indicates that a mismatch between its creation and modification dates is a useful indicator that a file may have been manipulated—but that information has a lesser impact on the overall document suspicion score than the digital signature check. It should be understood that different scoring methodologies including ranges and weight scales can be utilized without departing from the spirit or scope of the present disclosure.

An opinion score can measure a level of certainty that a check process determines that a PDF has been changed. An opinion score can take on any value between −1 and 1 (inclusive) or, in another suitable range set by the system 10 or by users. For example, if a PDF file contains more EOF markers than expected, an opinion score can be close to 1 to indicate that the PDF file is highly suspicious (which is in line with the positive weight for the EOF/ID check process). An opinion score can be null indicating that a check process does not apply or a check process provides no evidence relevant to a PDF file. An opinion score can be −1 indicating that the PDF file is known to be reliable. For example, when checking producer/creator mismatches but encountering pairings are known to be reliable, an opinion score can be −1. Decimal values can be used to measure uncertainty. For example, when a reliable producer and an unknown creator are found in a PDF file, a confident score can be 0.5 indicating that the PDF file is moderately suspicious.

Each check process can determine (e.g., manually or automatically generate) an opinion score and associated an evidence such as extracted metadata, structural information, etc. Each check process can further determine (e.g., manually or automatically assign or select) a weight for the evidence.

The system 10 can determine a opinion score for a particular check process using outputs from one or more steps of other check processes as described herein. The system 10 can also utilize one or more machine learning models (e.g., classifiers, neural network or other suitable machine learning models) to perform the check processes. For example, each check process can be performed by a machine learning model and the machine learning model can output a weight and an opinion score for a particular check process. A single machine learning model can perform all the check processes and output a weight and an opinion score for each check process. The machine learning model(s) can also determine an overall suspicion score as described below.

In step 58, the system 10 generates an overall suspicion score for the first PDF file. The overall suspicion score can be calculated by aggregating a weight and an opinion score associated with each check process run on that PDF file. For example, the suspicion scoring module 20*b* can calculate an overall suspicion score by multiplying the weight and the opinion score from each check process run on the PDF file and averaging the resulting values. Null values can be excluded. An overall suspicion score can be in a range from −1 to 1 (inclusive) in which "1" can indicate that the PDF file is highly suspicious and "−1" can indicate that the PDF file has not been manipulated. The range/scale of an overall suspicion score can be any suitable range determined by the system 10 or set by users. That overall suspicion score can be rescaled to accommodate the selected range.

In step 60, the system 10 determines whether the first PDF file is a suspicious file. For example, the system 10 can compare the overall suspicion score with a predetermined threshold that can be a value or a range of values indicating that a PDF file is a suspicious file. If the overall suspicion score meets the predetermined threshold (e.g., greater than the predetermined threshold or falls within the predetermined threshold range), the system 10 determines that the PDF file is a suspicious file.

In step 61, the system determines whether there are multiple versions available in the PDF file. If so, this information is retained and included in the report generated by the system in step 62, discussed below.

In step 62, the system 10 sends a report. For example, the suspicious file reporting module 20*c* can generate a report indicating that the PDF file is a suspicious file and send the report to other computing devices (e.g., computer systems, servers, personal computers, cloud computing devices, smart phones, or the like). Steps 56-62 can be repeated for a second PDF file of the one or more extracted PDF files.

Figure 4:
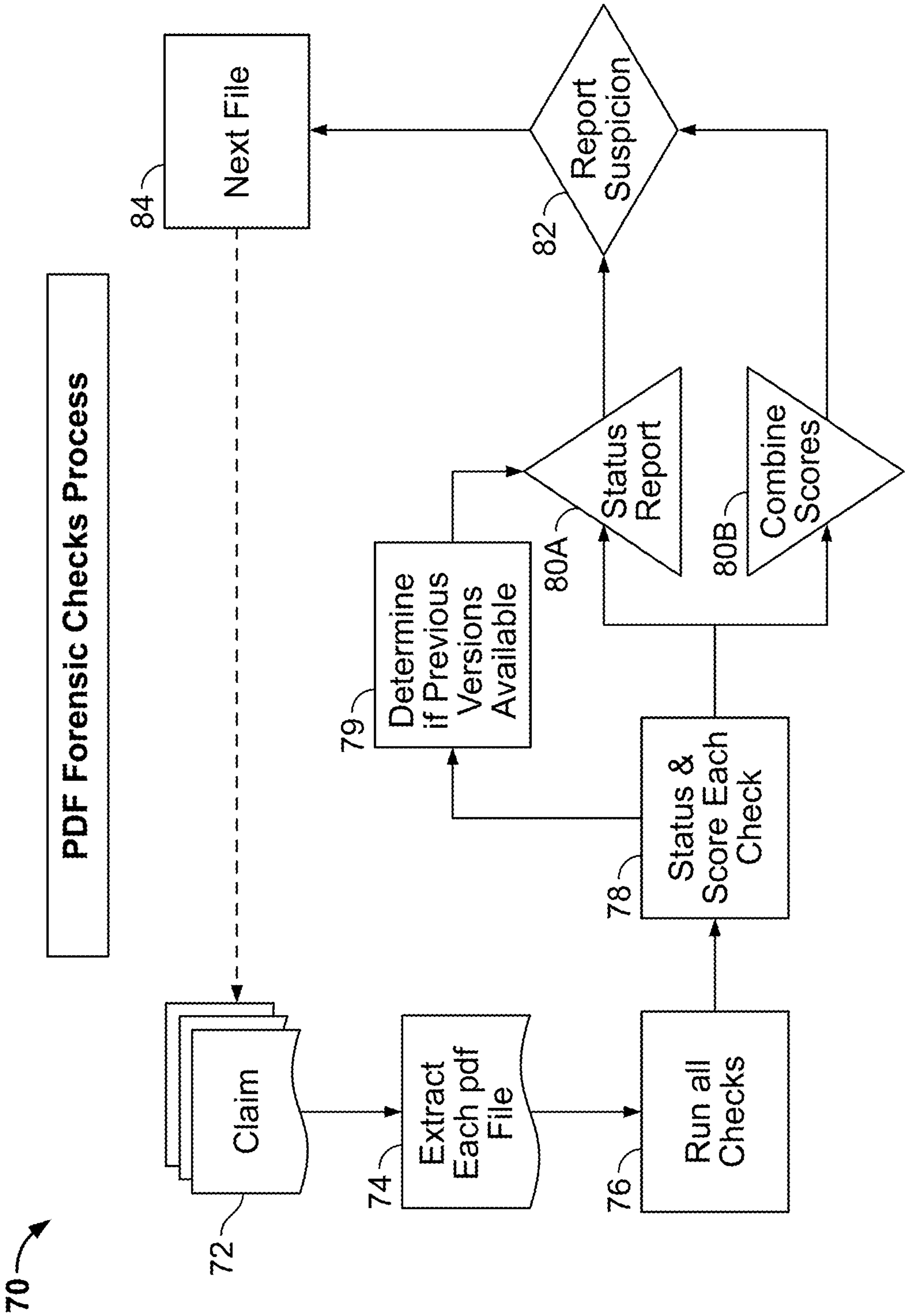

FIG. 4 is a flowchart showing overall processing steps carried out by the system 10 of the present disclosure. Beginning in step 72, the system 10 receives an insurance claim. Examples are described with respect to step 52 of FIG. 3. In step 74, the system 10 extracts each PDF file associated with a particular file set. Examples are described with respect to step 54 of FIG. 3. In step 76, the system 10 runs all applicable check processes, as described with respect to step 56 of FIG. 3.

In step 78, the system 10 determines a status of a particular check process and scores each check process. For example, the system 10 can determine the particular check process runs successfully or determine that the particular check process fails to run. Examples of scoring are described with respect to step 56 of FIG. 3. In step 79, the system determines if previous versions of the PDF file are available using steps 622-628 of FIG. 18 (discussed below), and if so, includes this information in the report generated in step 80A, discussed below.

In step 80A, the system 10 sends a report regarding the status of the check process. In step 80B, the system 10 combines scores to generate an overall suspicion score. The system 10 can determine that the extracted PDF file is a suspicious file based on the overall suspicion score. Examples are described with respect to steps 58 and 60 of FIG. 3.

In step 82, the system 10 generates a report indicating that the extracted PDF file is a suspicious file and sends the report. Examples are described with respect to step 62 of FIG. 3. In step 84, the system 10 repeats steps 76-82 for a next extracted file.

Figure 5A:
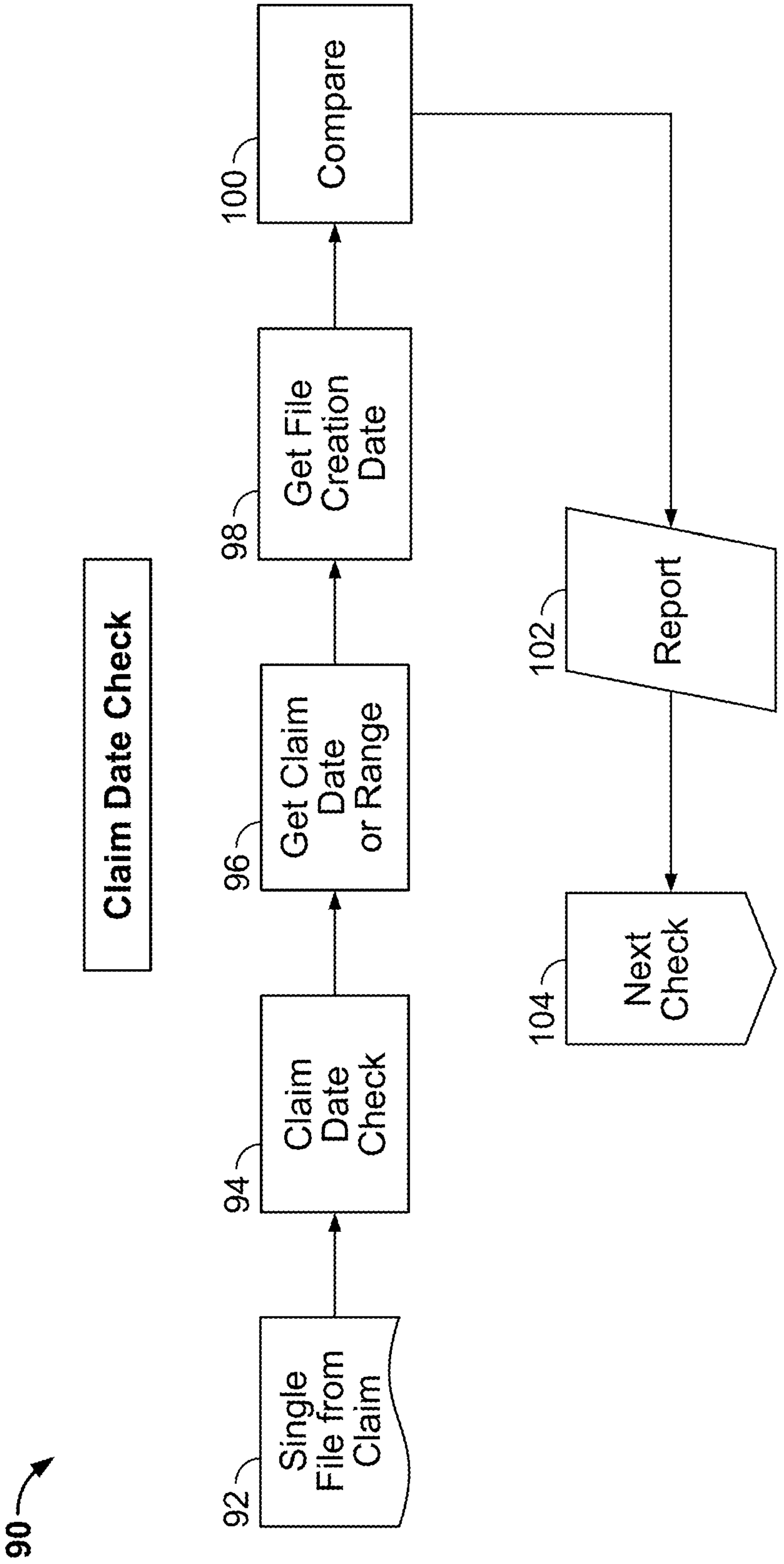
FIG. 5A is a flowchart illustrating processing steps of a claim date check process in greater detail.

FIG. 5A is a flowchart illustrating processing steps of a date check process in greater detail. Beginning in step 92, the system 10 receives a PDF file associated with a file set, a job, etc. For example, the PDF file check module 20*a* can receive a PDF file associated with the job.

In step 94, the system 10 selects a date check process to perform. For example, the PDF file check module 20*a* selects a date check process from multiple check processes.

In step 96, the system 10 determines a date range. For example, the PDF file check module 20*a* can receive a start date and an end date indicating a range of dates valid for a given job.

In step 98, the system 10 determines a file creation date. For example, as shown in FIG. 5B (which is a diagram showing a PDF header 46 of a PDF file in a text editor), the header 46 of the PDF file includes a creation date 106. The system 10 can identify the creation date 106 within the PDF file by querying/searching within the PDF file for a creation date.

In step 100, the system 10 compares the file creation date with the date range to determine whether the file creation date falls within the date range. In some cases, based on the comparison, the system 10 can determine an opinion score and a weight for the evidence.

In step 102, the system 10 generates a report and sends the report to the computing device 12 or other suitable computing device, or other components (e.g., the database 14, the suspicion scoring module 20*b*, or the like) of the system 10. In step 104, the system 10 moves to the next PDF file to be processed.

Figure 6A:
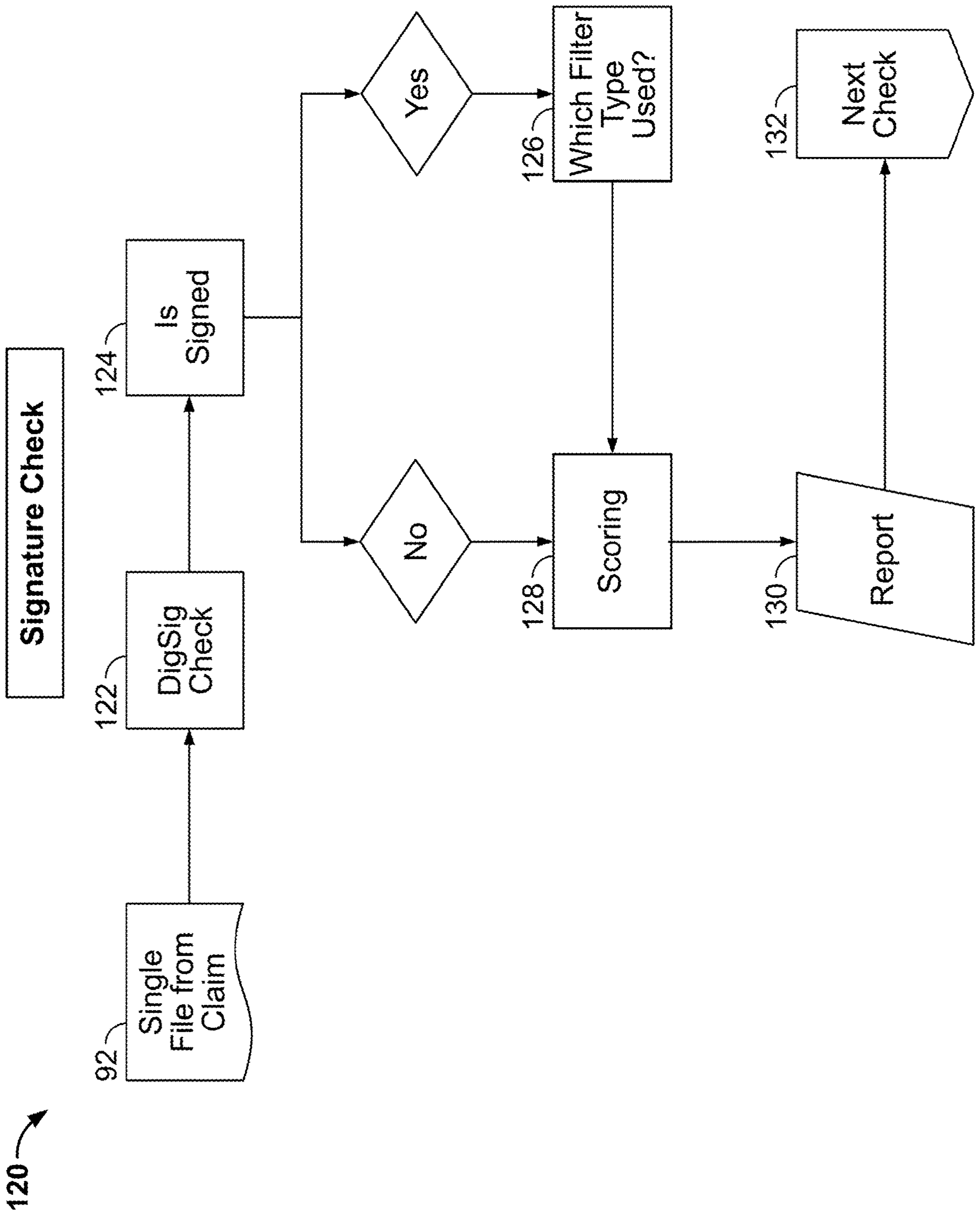
FIG. 6A is a flowchart illustrating a signature check process in greater detail.

FIG. 6A is a flowchart illustrating processing steps of a signature check process in greater detail. Beginning in step 92, the system 10 receives the PDF file, as described above. In step 122, the system 10 initiates the signature check process to perform.

In step 124, the system 10 determines whether the PDF file is signed. For example, the system 10 can query a field type dictionary (DT) for a SIG key, associated V key if present, and/or other associated signature dictionaries for areas of the file that are not locked and/or information on an signing entity. If the system 10 determines that the PDF file is signed, the system 10 moves to step 126. If the system 10 determines that the PDF file is not signed, the system 10 moves to step 128.

Figure 6B:
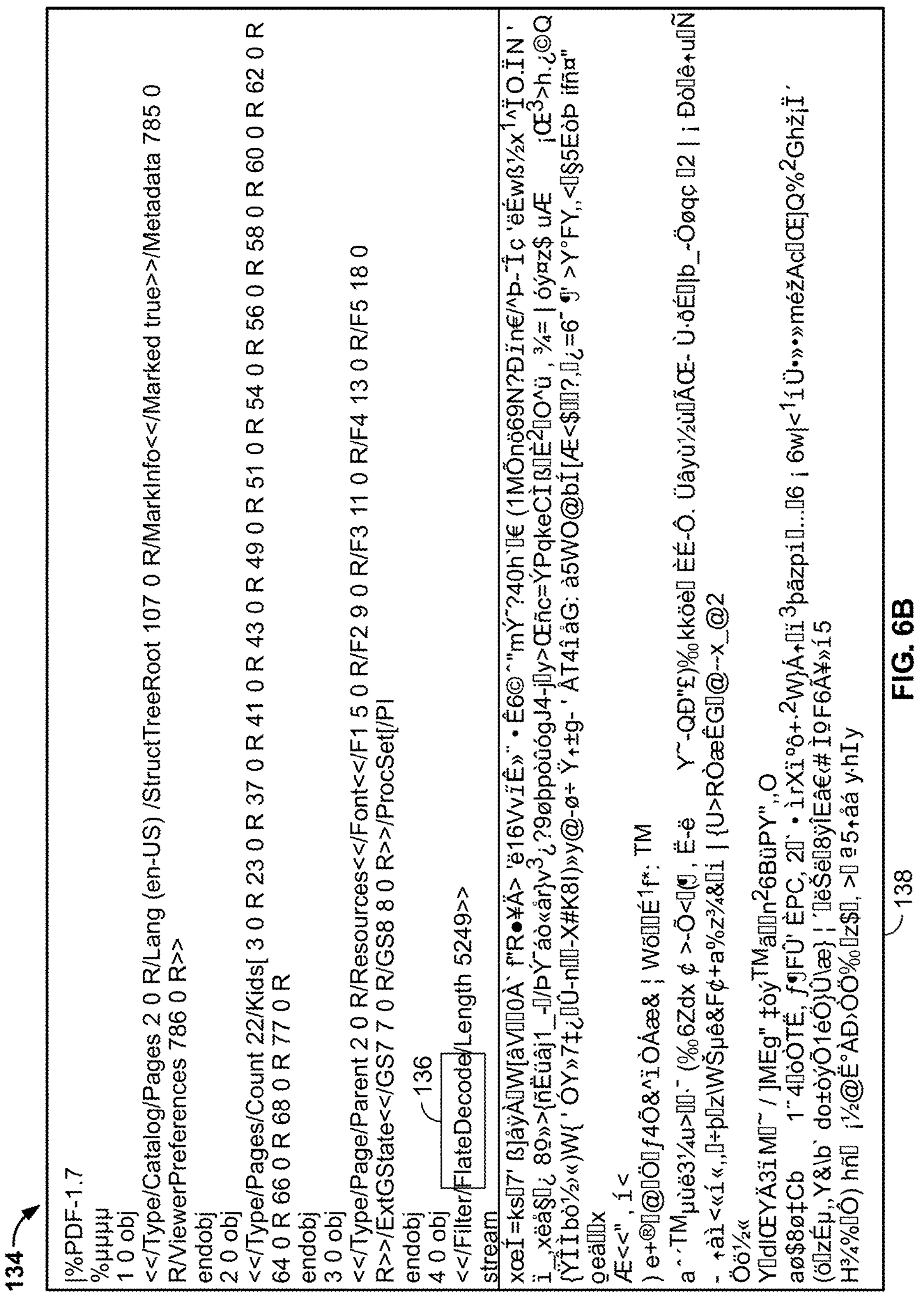
FIG. 6B is a diagram showing a portion of a PDF file displayed in a text editor.

In step 126, the system 10 identifies a filter type used in the PDF file and utilizes that information to determine whether the filter affects (or does not affect) the authenticity of the PDF file. As shown in FIG. 6B (which illustrates a portion 134 of a PDF file in a text editor and a filter type 136), a portion 138 is in a binary format and is unreadable using the text editor, but the system 10 can process PDF files in any formats. It should be understood that different PDF specifications can have different filters from the PDF 1.7 specifications.

In step 128, the system 10 scores the PDF file. For example, if the system 10 determines that the PDF file is not signed, the system 10 can apply (set) a weight and an opinion score indicating that the PDF file is likely to have been altered. If the system 10 determines that the PDF file is signed and identifies the filter type used in the PDF file, the system 10 can generate details of who signed, when, and what signing system/agency verifies the signatures to be output in a report. The system 10 can also search a ByteRange key to determine whether any changes have been made to the PDF file since signing. If the system 10 determines that changes are made, the system 10 can apply a weight and an opinion score indicating that the PDF file is highly likely to have been altered. If the system 10 determines that no changes are made, the system 10 can apply a weight and a opinion score indicating that the PDF file is unlikely to have been altered.

In step 130, the system 10 generates a report and sends the report to the computing device 12 or other suitable computing device, or other components (e.g., the database 14, the suspicion scoring module 20*b*, or the like) of the system 10. The report can include the weight, the opinion score, an indication indicating whether the PDF file is signed, who signed, when, and what signing system/agency verifies the signatures, and other suitable data associated with the signatures. In step 132, the system 10 moves to the next PDF file to be processed.

Figure 7:
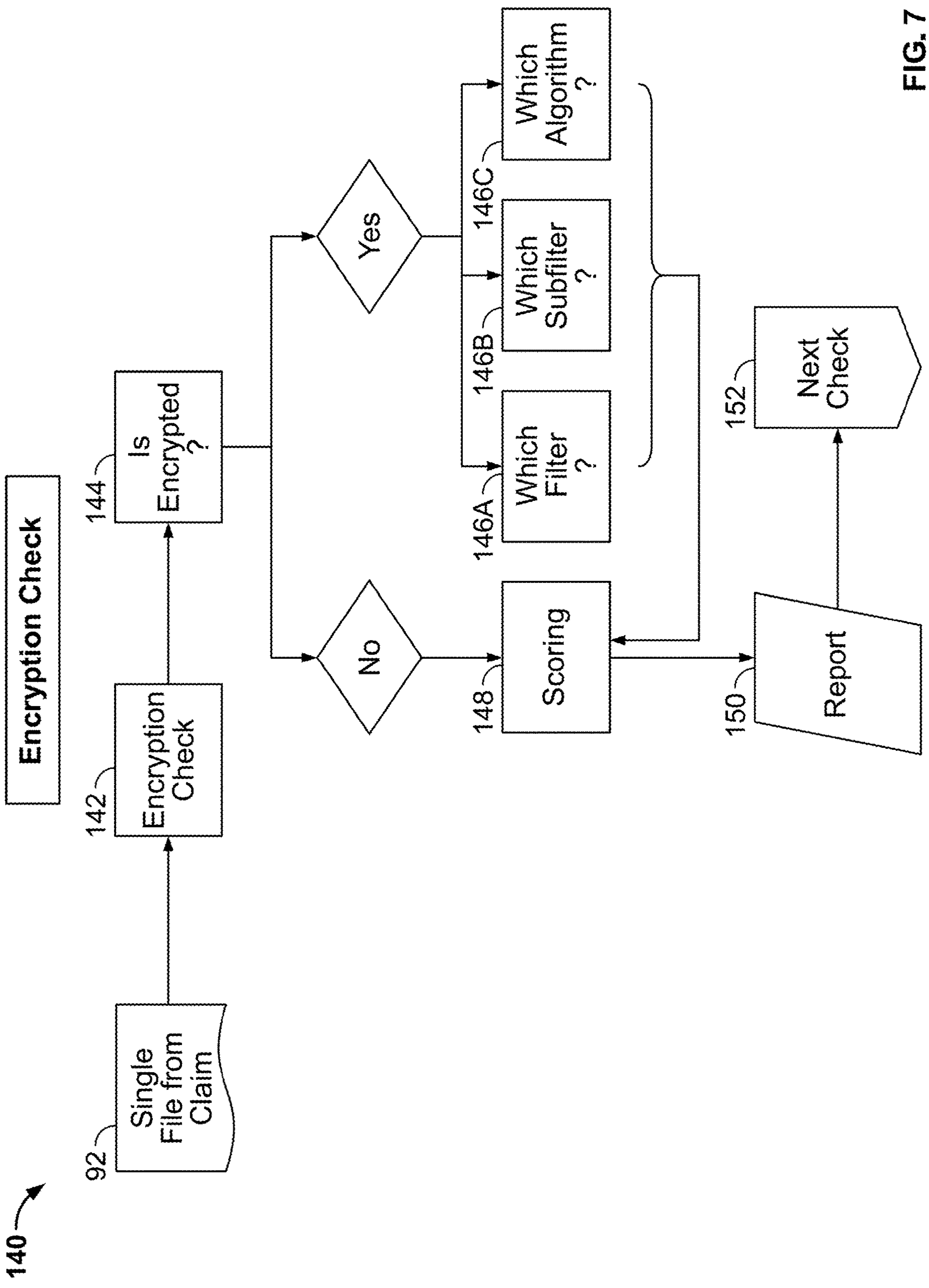
FIG. 7 is a flowchart illustrating a signature check process in greater detail.

FIG. 7 is a flowchart illustrating processing steps of an encryption check process in greater detail. Beginning in step 92, the system 10 receives the PDF file associated with the job as described above. In step 142, the system 10 initiates an encryption check process to perform.

In step 144, the system 10 determines whether the PDF file is encrypted. For example, the system 10 can query a file trailer an Encrypt key and can return true or false. If the system 10 finds the encrypt key, the system 10 can query a Filter key in an encryption dictionary and return the name of the preferred security handler for the document. The system 10 can query a V key if available. The system 10 can return an encryption algorithm number/type as describe below. If the system 10 determines that the PDF file is encrypted, the system 10 moves to steps 146A-146C. If the system 10 determines that the PDF file is not encrypted, the system 10 moves to step 148.

In step 146A, the system 10 identifies a filter type used in the PDF file. In step 146B, the system 10 may identify a subfilter used in the PDF file, if available. In step 146C, the system 10 determines information associated with an algorithm used for encryption, such an algorithm name, an algorithm number, an algorithm type, or the like.

In step 148, the system 10 scores the PDF file. For example, the system 10 can apply a weight and an opinion score indicating that the PDF file is likely (or, unlikely) to have been altered.

In step 150, the system 10 generates a report and sends the report to the computing device 12 or other suitable computing device, or other components (e.g., the database 14, the suspicion scoring module 20*b*, or the like) of the system 10. The report can include the weight, the opinion score, information indicating whether the PDF file is encrypted, the filter type, the subfilter, the algorithm and/or associated data. In step 152, the system 10 moves to the next PDF file to be processed.

Figure 8:
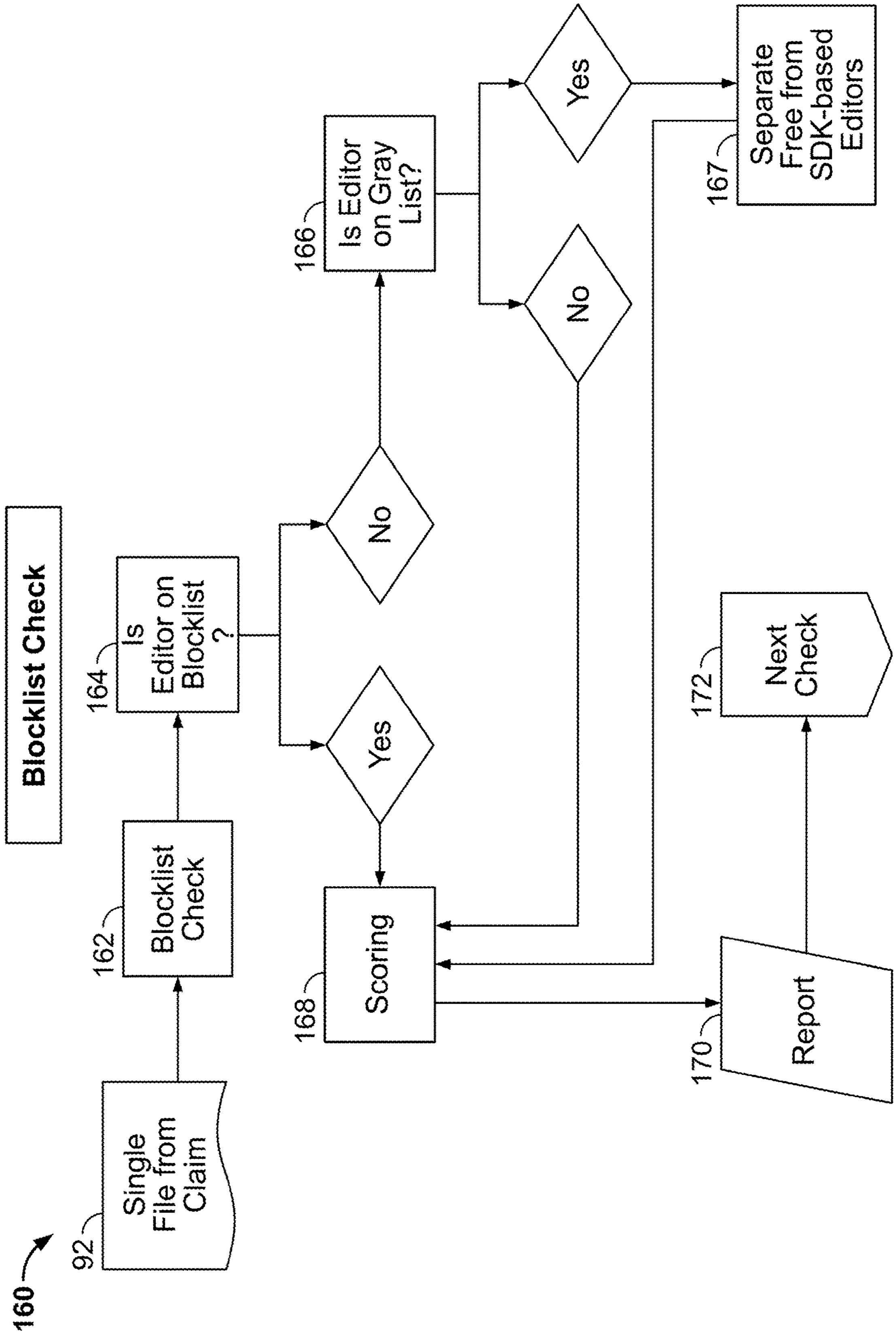
FIG. 8 is a flowchart illustrating a blocklist check process in greater detail.

FIG. 8 is a flowchart illustrating processing steps of a blocklist check process in greater detail. Beginning in step 92, the system 10 receives the PDF file associated with the insurance claim, as described above.

In step 162, the system 10 selects the blocklist check process to perform.

In step 164, the system 10 determines whether an editor of the PDF file is on a blocklist. A blocklist includes items that have a high likelihood of maliciousness, invalidity, or other issues identifying the item as not meeting the criteria for acceptance. For example, the system 10 can identify an editor of the PDF file and compare the identified editor with a blocklist stored in the database 14 and/or received from a user input/other computing devices. If the system 10 determines that the identified editor is not on the blocklist, the system 10 moves to step 166. If the system 10 determines that the identified editor is on the blocklist, the system 10 moves to step 168.

In step 166, the system 10 optionally determines whether the identified editor is on a graylist. A graylist refers to a list that temporarily blocks anything on the list until an additional step is performed. The system 10 can compare the identified editor with a graylist stored in the database 14 and/or received from a user input/other computing devices. If the system 10 determines that the identified editor is not on the graylist, the system 10 moves to step 168. If the system 10 determines that the identified editor is on the graylist, the system 10 moves to steps 167 and then moves to step 168.

In step 167, the system 10 separates the identified editor from SDK-based editors. A PDF software development kit (SDK) can include but is not limited to: editors, code libraries, and APIs.

In step 168, the system 10 scores the PDF file. For example, if the system 10 determines that the identified editor is on the blocklist, the system 10 applies a weight and an opinion score indicating that the PDF file is highly likely to have been altered. If the system 10 determines that the identified editor is not on the blocklist but on the graylist, the system 10 can apply a weight and an opinion score indicating that the PDF file may have been altered. If the system 10 determines that the identified editor is neither on the blocklist nor on the graylist, the system 10 can apply a weight and an opinion score indicating that the PDF file is less likely to have been fraudulently altered.

In step 170, the system 10 generates a report and sends the report to the computing device 12 or other suitable computing device, or other components (e.g., the database 14, the suspicion scoring module 20*b*, or the like) of the system 10. The report can include the weight, the opinion score, indications indicating whether the identified editor is on the blocklist or on the grey list or both, the identified editor, and/or associated data. In step 172, the system 10 moves to the next PDF file to be processed.

Figure 9A:
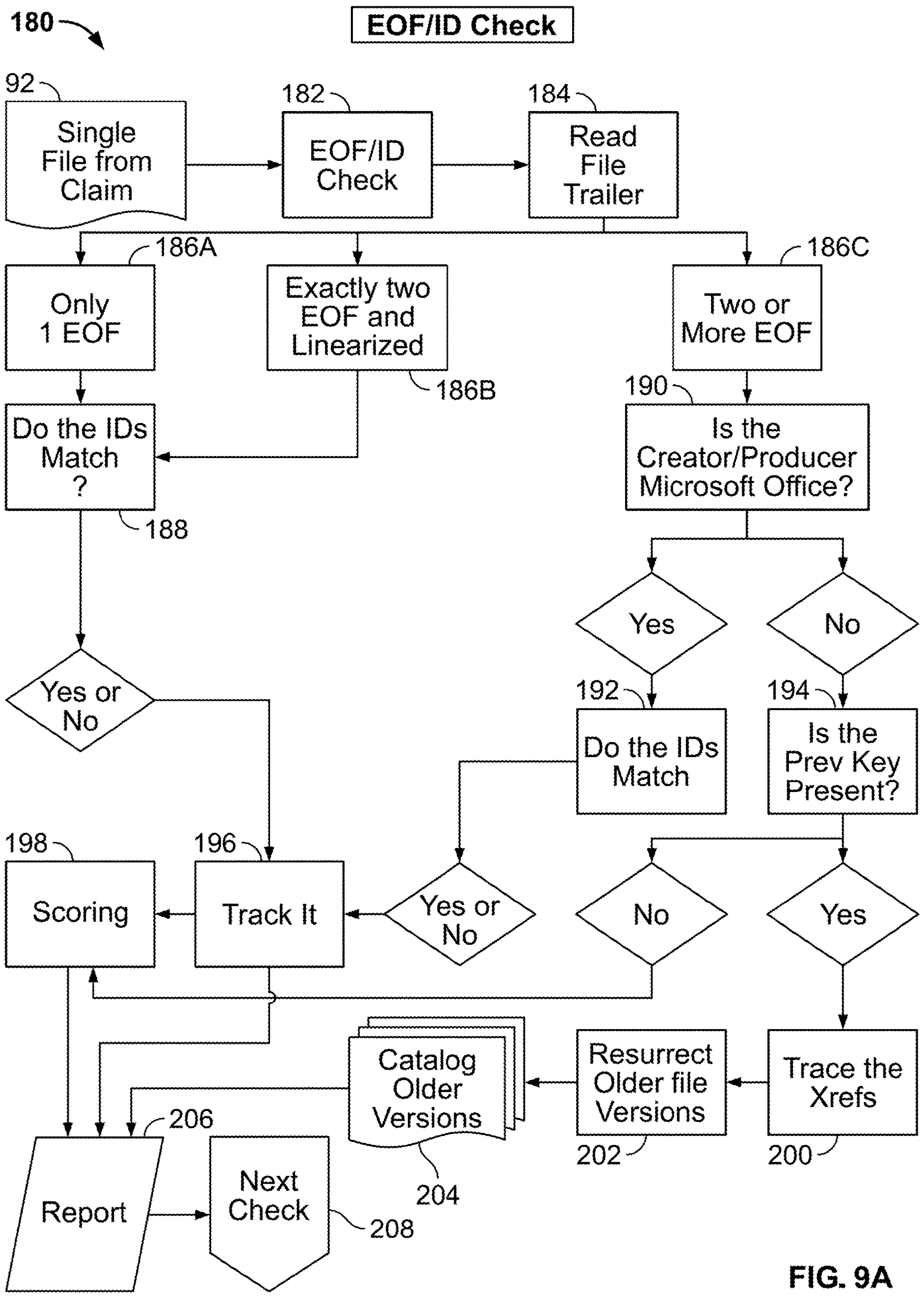
FIG. 9A is a flowchart illustrating processing steps of an end-of-file (EOF)/identifier (ID) check process in greater detail.
Figure 9B:
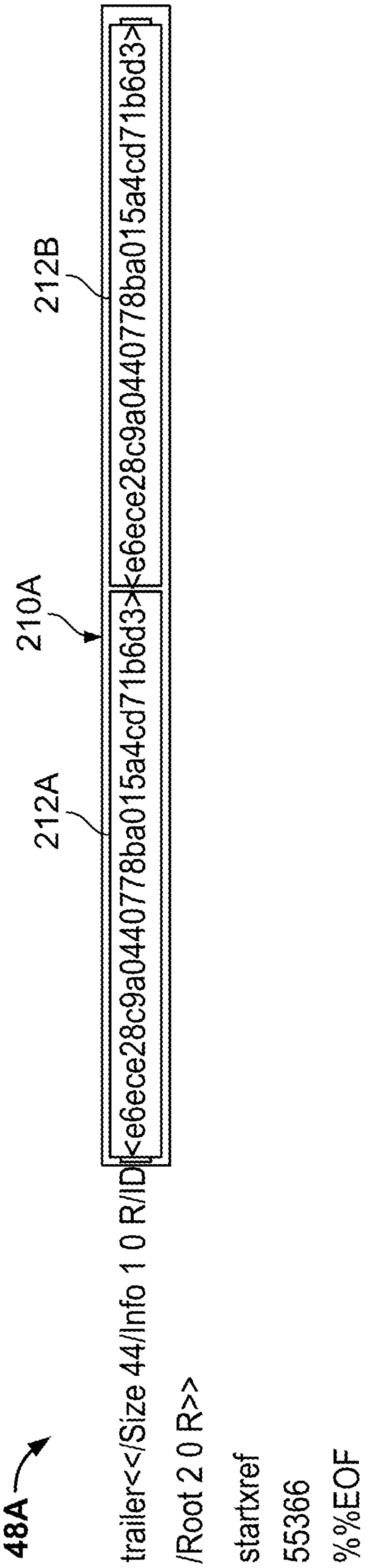
FIG. 9B is a diagram showing a trailer of an unaltered PDF file.

FIG. 9A is a flowchart illustrating processing steps of an EOF/ID check process in greater detail. Beginning in step 92, the system 10 receives the PDF file associated with the job, as described above. In step 182, the system 10 initiates the EOF/ID check process to perform.

In step 184, the system 10 processes a file trailer in the PDF file. For example, as shown in FIGS. 2B and 2C, the system 10 can find the file trailer 48A-48B and determine data contained in the file trailer 48A-48C.

In step 186A, the system 10 determines that there is only one EOF key in the file trailer. In step 186B, the system 10 determines that there are exactly two EOF keys in the file trailer and the PDF file is linearized. In step 186C, the system 10 determines that there are two or more EOF keys in the file trailer.

Figure 9C:
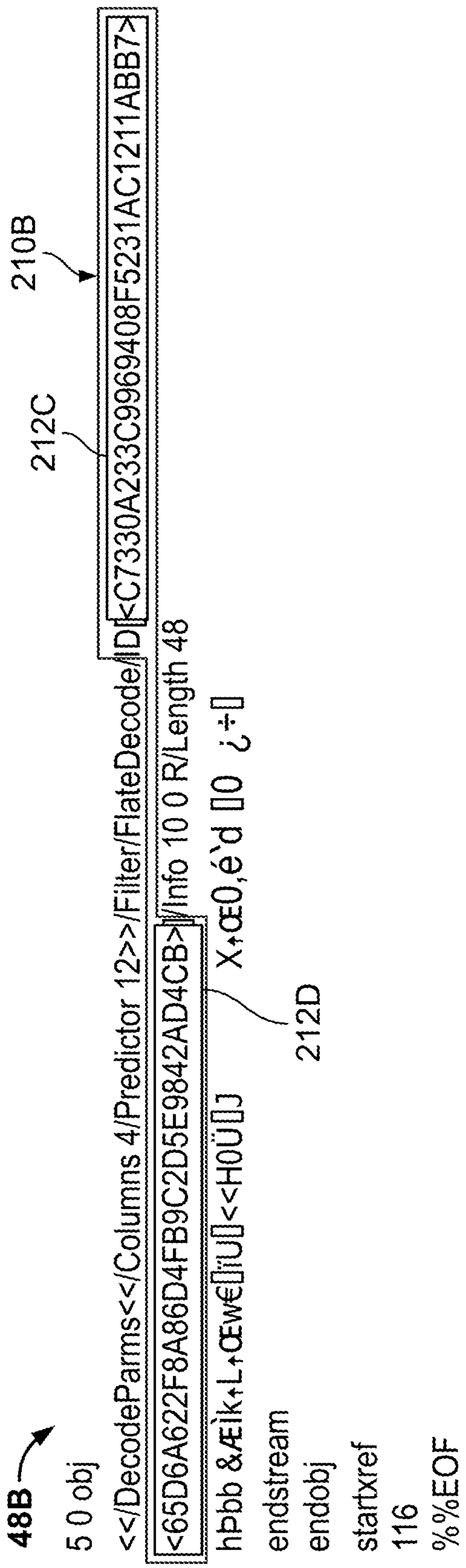
FIG. 9C is a diagram showing a trailer of an altered PDF file.
Figure 9D:
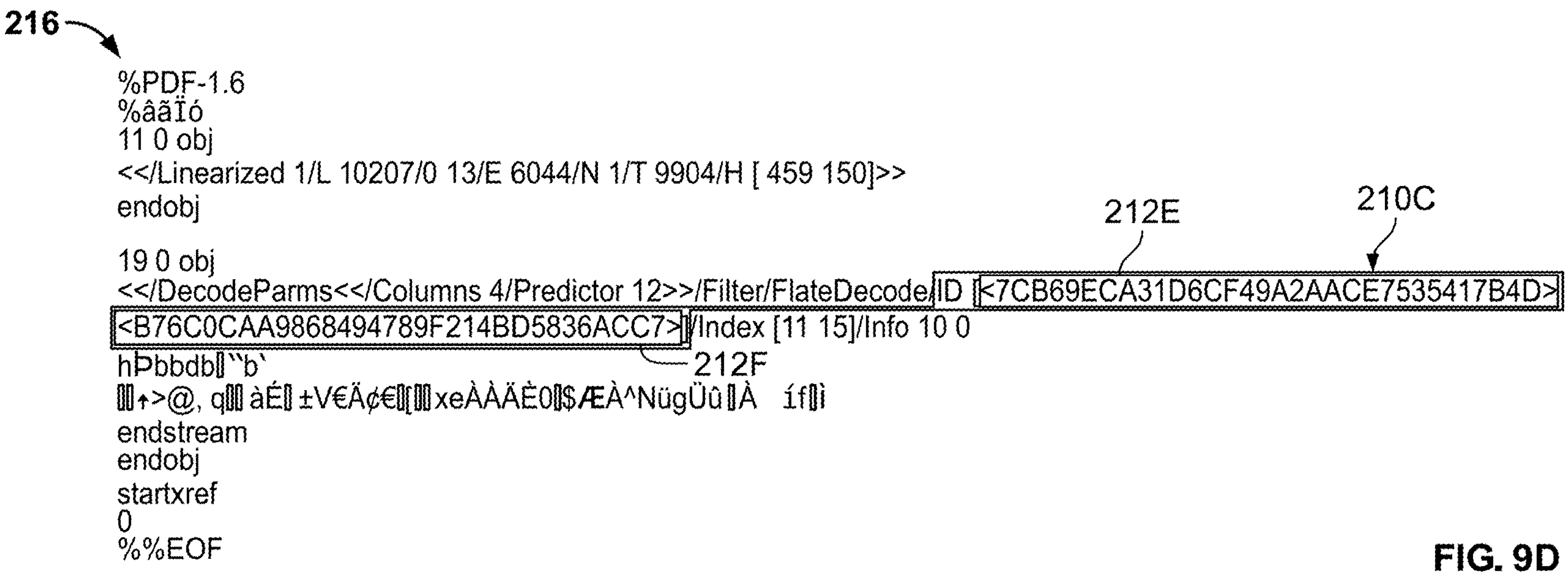
FIG. 9D is a diagram showing a portion of a linearized PDF file with a first EOF.

In step 188, the system 10 determines whether two UUIDs (e.g., arrays of two byte-strings constituting a PDF file identifier) included in an ID key (assuming that such optional ID keys exist) are matched (e.g., identical). For example, following each of step 186A and step 186B, the system 10 can identify an ID key and determine whether two UUIDs are included in the ID key. If two UUIDs are included in the ID key, the system 10 can determine whether the two UUIDs are identical. As show in FIG. 9B (which is a diagram showing a trailer 48A of an unaltered PDF file in a text editor), the trailer 48A includes a UUID 212A and a UUID 212B in an ID key 210A. The UUID 212A matches the UUID 212B. As shown in FIG. 9C (which is a diagram showing a trailer 48B of an altered PDF file in a text editor), the altered PDF file can have a "Save As" action performed after a change is made and it includes one trailer and one EOF. The first line of the PDF file has been truncated. The trailer 48B includes a UUID 212C and a UUID 212D in an ID key 210B. The UUID 212C is different from the UUID 212D indicating that the PDF file has been changed. As shown in FIG. 9D (which is a diagram showing a portion 216 of a linearized PDF file with a first EOF in a text editor), an ID key 210C includes a UUID 212E and a UUID 212F. The UUID 212E is different from the UUID 212F due to linearization of the file.

Due to an anomaly in the PDF written by Microsoft Office applications, in step 190, the system 10 determines whether creator/producer of the PDF file is Microsoft Office. If the system 10 determines that the creator/producer of the PDF file is Microsoft Office, the system 10 moves to step 192. If the system 10 determines that the creator/producer of the PDF file is not Microsoft Office, the system 10 moves to step 194.

Figure 9E:
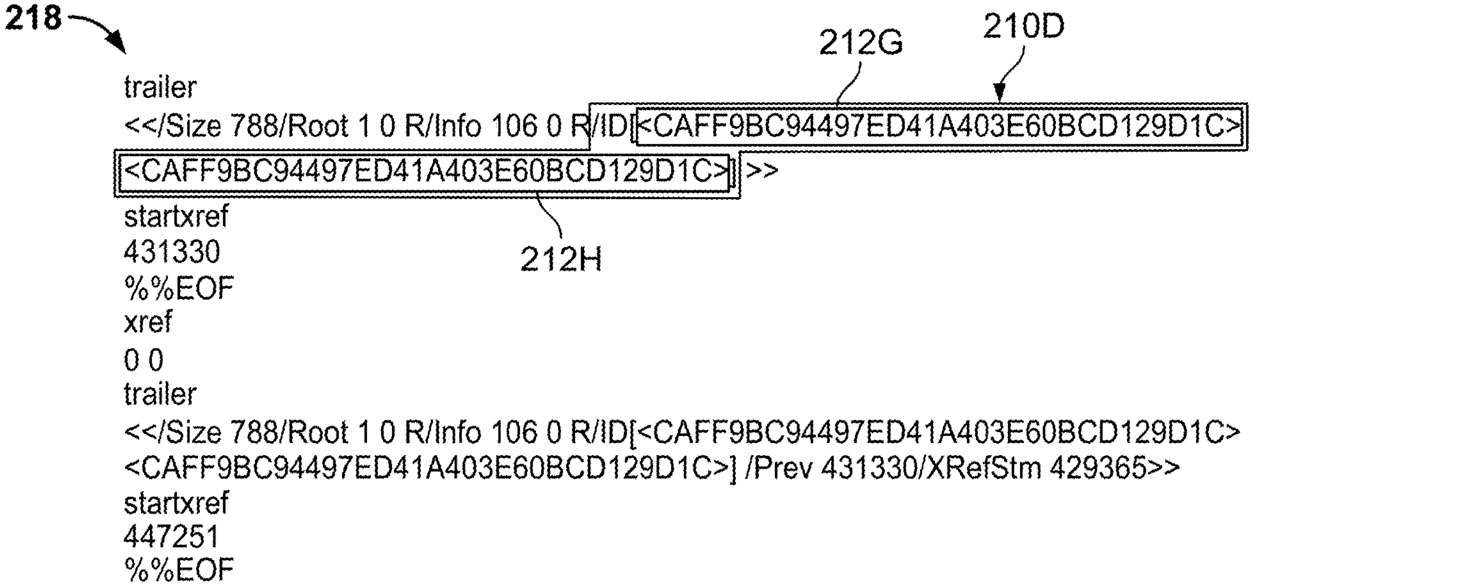
FIG. 9E is a diagram showing a portion of a Microsoft Office-created PDF file.

In step 192, the system 10 determines whether two UUIDs included in an ID key are matched (e.g., identical). For example, as shown in FIG. 9E which is a diagram showing a portion 218 of a Microsoft Office-created PDF file in a text editor, an ID key 210D includes a UUID 212G and a UUID 212H. The UUID 212G matches the UUID 212H indicating that the Microsoft Office-created PDF file is unaltered.

In step 194, the system 10 determines whether a Prev key is present in the PDF file. If the system 10 determines that the Prev key is present, the system 10 moves to step 200. If the system 10 determines that the Prev key is not present, the system 10 moves to step 198. In step 196, the system 10 tracks the determination results from each of steps 188 and 192.

In step 198, the system 10 scores the PDF file. If the system 10 determines that two UUIDs included in the ID key from step 188 or step 192 are identical, the system 10 can assign a weight and an opinion score indicating that the PDF file is unlikely to be changed. If the system 10 determines that two UUIDs included in the ID key from step 188 or step 192 are different, the system 10 can assign an opinion score indicating that the PDF file is highly likely to be changed. If the system 10 determines that the Prev key is not present from step 194, the system 10 can determine a different opinion score.

In step 200, the system 10 traces the cross-reference tables of the PDF file. For example, as shown in FIGS. 2B and 2C, the system 10 can identify the cross-reference tables 46A-46N and can trace the cross-reference tables 46A-46N. As seen in FIG. 9E, step [200] can identify there are two EOF marks on the file, find the Prev key with its associated offset and the pointer to the cross reference stream and use this information to identify deleted, changed, or added objects since the last incremental save. In step 202, the system 10 resurrects older file versions. For example, the system 10 can use the information gleaned from the cross-reference tables and the placement of the changed objects within the file structure in step 200 to resurrect previous versions of the PDF file.

In step 204, the system 10 catalogs older file versions.

In step 206, the system 10 generates a report and sends the report to the computing device 12 or other suitable computing device, or other components (e.g., the database 14, the suspicion scoring module 20*b*, or the like) of the system 10. The report can include the weight, the opinion score, note whether the two IDs are identical, the list of the previous versions of the PDF file, and/or associated data. In step 206, the system 10 moves to the next PDF file to be processed.

Figure 10:
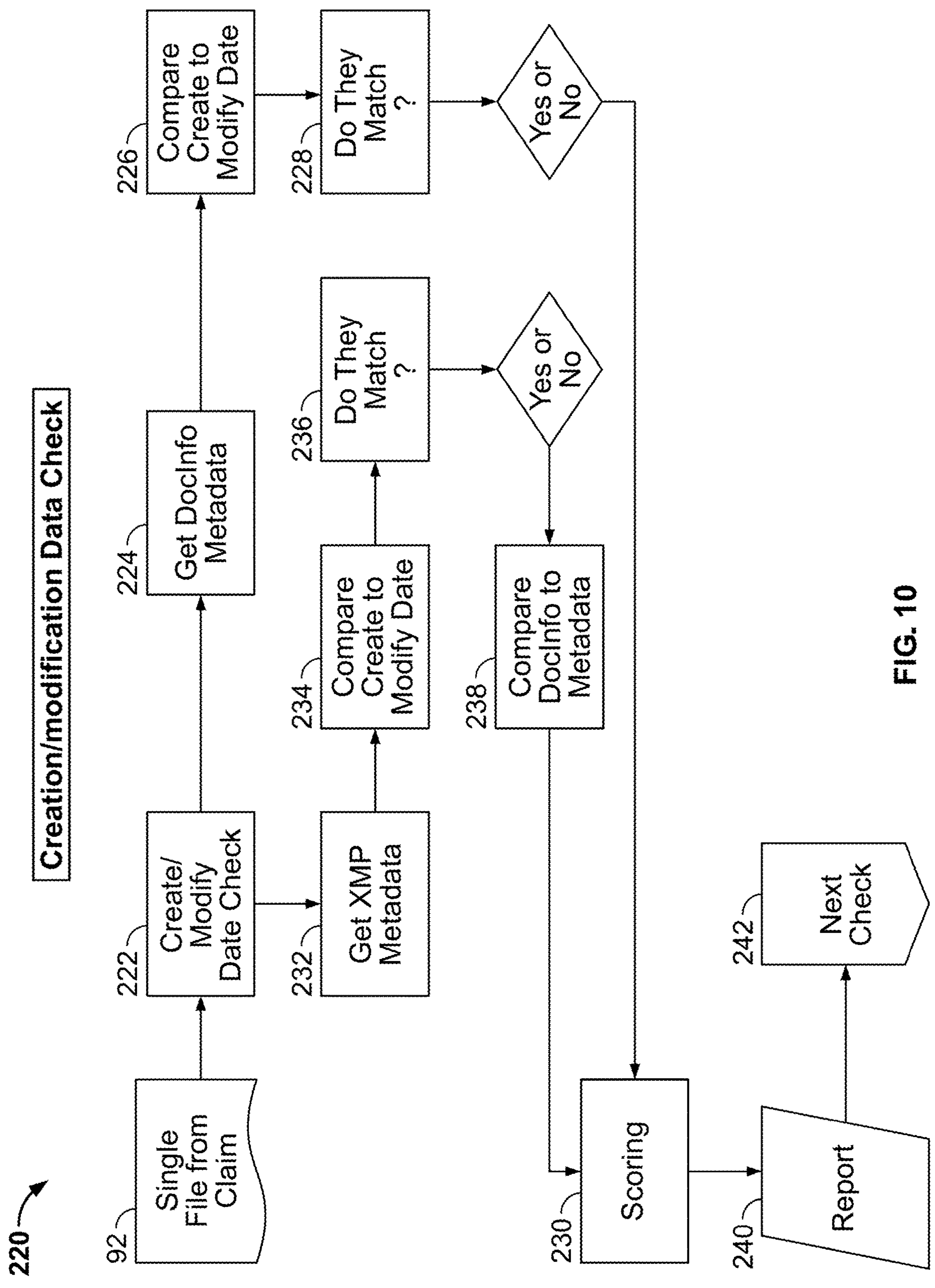
FIG. 10 is a flowchart illustrating processing steps of a creation/modification date check process in greater detail.

FIG. 10 is a flowchart illustrating processing steps of a creation/modification date check process in greater detail. Beginning in step 92, the system 10 receives the PDF file associated with the job, as described above. In step 222, the system 10 selects a creation/modification date check process to perform. For example, the PDF file check module 20*a* selects a creation/modification date check process from multiple check processes.

In step 224, the system 10 identifies the metadata in the document information dictionary of the PDF file. For example, as shown in FIG. 5B, the system 10 can identify whether the creation date 106 and a modification date 108 exist within the document information dictionary metadata. If this metadata exists within the file, in step 226, the system 10 compares the creation date with the modification date from step 224. In step 228, the system 10 determines whether the creation date matches the modification date. The system 10 can send the determination result to step 230 for scoring as described below.

In step 232, the system 10 identifies whether or not extensible metadata platform (XMP) information exists in the document. For example, following step 222 as described above, the system 10 can identify XMP information from the metadata stream of the PDF file to obtain a creation date and a modification data from the XMP information. In step 234, the system 10 compares the creation date with the modification date from step 232. In step 236, the system 10 determines whether the creation date matches the modification date obtained from step 234.

In step 238, the system 10 compares the dates from the document information dictionary with the XMP information. For example, the system 10 can compare the creation date in the document information dictionary (e.g., obtained from step 224) to the creation date in the XMP information (e.g., obtained from step 232). The system 10 can further compare the modification date in the document information dictionary (e.g., obtained from step 224) to the modification date in the XMP information (e.g., obtained from step 232). The system 10 can further determine if a metadata date exists. The system 10 can send the comparison results to step 230 for scoring as described below.

In step 230, the system 10 scores the PDF file. For example, following step 228, if the system 10 determines that the creation date matches the modification date, the system 10 can assign a weight and an opinion score indicating that the PDF file is unlikely to have been altered. If the system 10 determines that the creation date does not match the modification date, the system 10 can assign a weight and an opinion score indicating that the PDF file is highly likely to have been altered. As shown in FIG. 5B, the creation date 106 is different than the modification date 108, which indicates that the PDF file is highly likely to have been altered. Following step 238, if the system 10 determines that the document information matches the XMP information, such as the creation date from the document information matches the creation date from the XMP information, the modification date from the document information matches the modification date from the XMP information, the system 10 can assign a weight and an opinion score indicating that the PDF file is unlikely to have been altered. If the system 10 determines that the document information mismatches the XMP information, such as the creation date from the document information mismatches the creation date from the XMP information, and/or the modification date from the document information mismatches the modification date from the XMP information, the system 10 can assign a weight and an opinion score indicating that the PDF file is highly likely to have been altered.

In step 240, the system 10 generates a report and sends the report to the computing device 12 or other suitable computing device, or other components (e.g., the database 14, the suspicion scoring module 20*b*, or the like) of the system 10. The report can include the weight, the opinion score, the creation dates and the modification dates from the document information and the XMP information, comparison results indicating information match or mismatch, and/or associated data. In step 242, the system 10 moves to the next PDF file to be processed.

Figure 11:
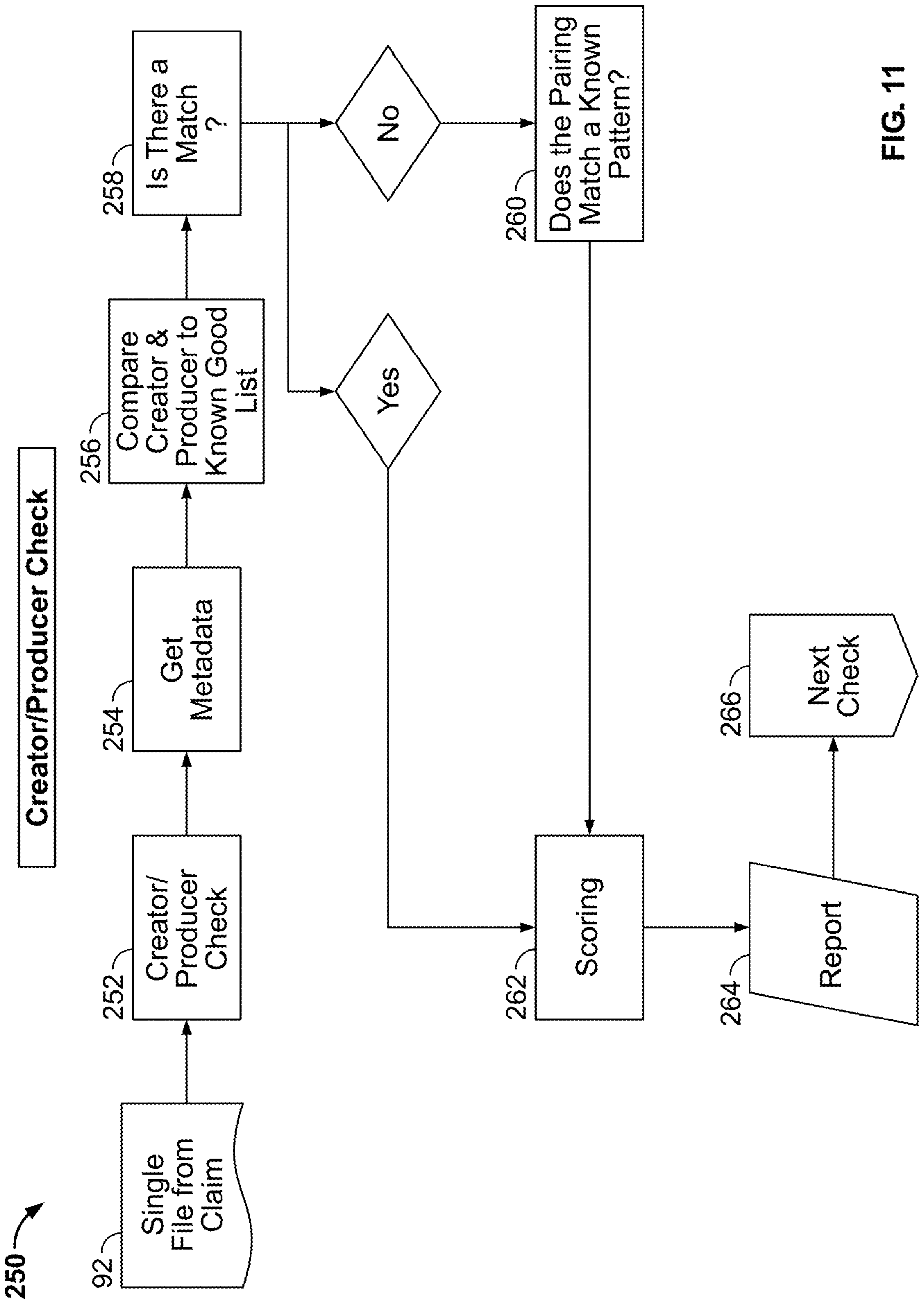
FIG. 11 is a flowchart illustrating processing steps of a creator/producer check process in greater detail.

FIG. 11 is a flowchart illustrating processing steps of a creator/producer check process in greater detail. Beginning in step 92, the system 10 receives the PDF file associated with the insurance claim, as described above. In step 252, the system 10 selects a creator/producer check process to perform.

In step 254, the system 10 determines metadata to identify a creator and/or a producer of the PDF file. For example, the system 10 can identify whether the information within the document information metadata includes the creator and/or the producer. In step 256, the system 10 compares the identified creator/producer with a list having valid creator/producer pairs.

In step 258, the system 10 determines whether the identified creator/producer pair matches one pair of the list. If the system 10 determines that the identified creator/producer pair matches one pair of the list, the system 10 moves to step 262. If the system 10 determines that the identified creator/producer pair mismatches any pairs of the list, the system 10 moves to step 260 and then moves to step 262.

In step 260, the system 10 determines whether the creator/producer pair matches a known pattern. A known pattern describes that a creator can be paired with a producer in a known and repeated manner.

In step 262, the system 10 scores the PDF file. For example if the system 10 determines that the identified creator/producer pair matches one pair of the list, the system 10 can apply a weight and an opinion score indicating that the PDF file is unlikely to have been altered. If the system 10 determines that the identified creator/producer pair mismatches any pairs of the list and the system 10 further determines that the known pattern indicates that the identified creator/producer pair is valid, the system 10 can apply a weight and an opinion score indicating that the PDF file is unlikely to have been altered. If the system 10 further determines that the known pattern indicates that the identified creator/producer pair is suspicious, the system 10 can apply a weight and a opinion score indicating that the PDF file is likely to have been altered.

In step 264, the system 10 generates a report and sends the report to the computing device 12 or other suitable computing device, or other components (e.g., the database 14, the suspicion scoring module 20*b*, or the like) of the system 10. The report can include the weight, the opinion score, the creator, the producer, the known pattern, the comparison results indicating information match or mismatch, and/or associated data. In step 266, the system 10 moves to the next PDF file to be processed.

Figure 12:
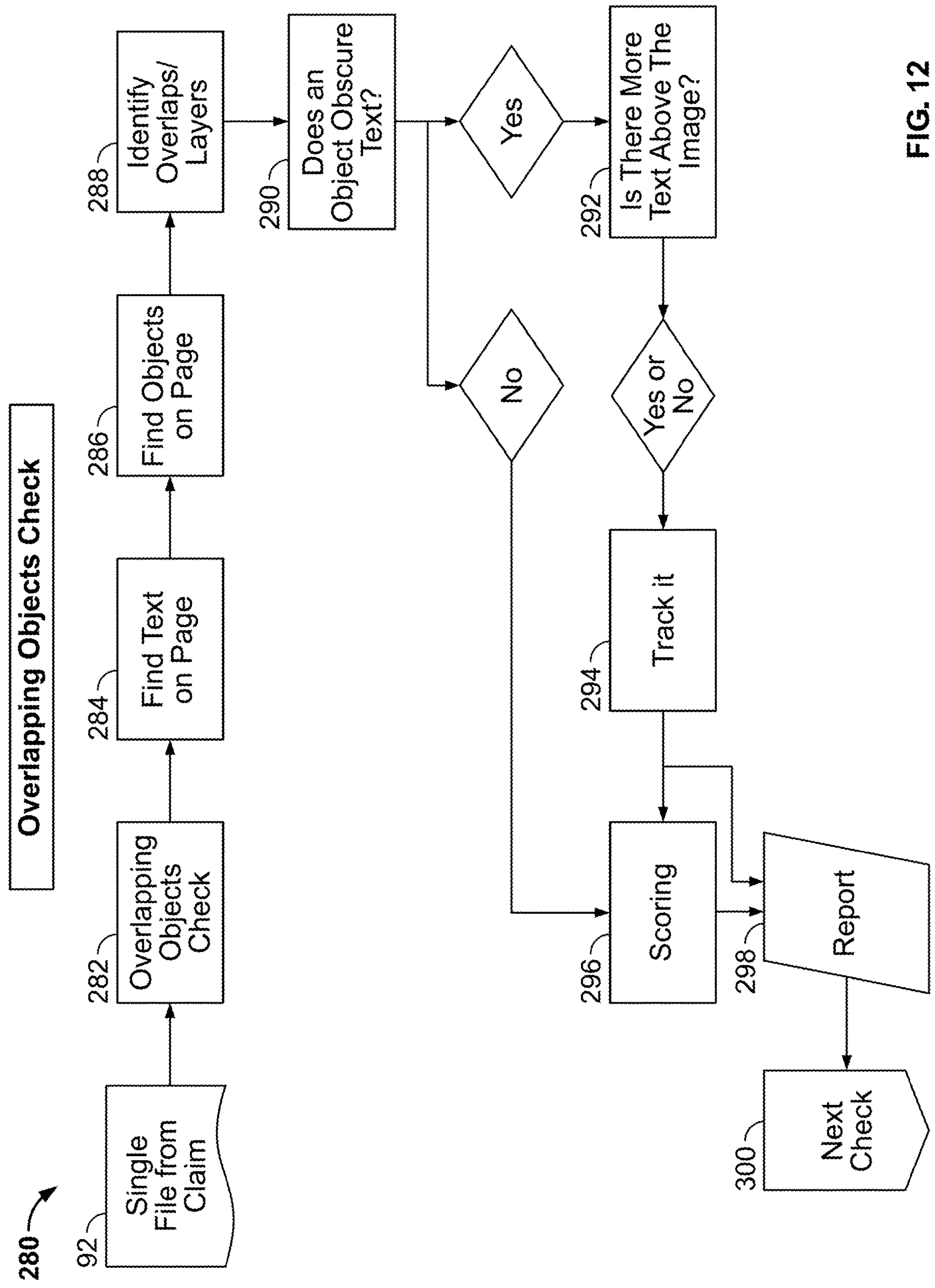
FIG. 12 is a flowchart illustrating processing steps of an obscured-object check process in greater detail.

FIG. 12 is a flowchart illustrating processing steps of an obscured object check process 280 of step 56 in greater detail. Beginning in step 92, the system 10 receives the PDF file. In step 282, the system 10 selects a creator/producer check process to perform. For example, the PDF file check module 20*a* selects an obscured object check process from multiple check processes.

In step 284, the system 10 identifies text on a page of a PDF file. In step 286, the system 10 identifies objects on the same page. In step 288, the system 10 identifies corresponding locations for the identified text and the identified objects.

In step 290, the system 10 determines whether one or more identified objects or other text obscure the identified text. If the system 10 determines that one or more identified objects obscure the identified text, the system 10 moves to step 292. If the system 10 determines that the identified objects do not obscure the identified text, the system 10 moves to step 296.

In step 292, the system 10 determines whether there is some text above the identified objects, and/or whether text objects are in close proximity to each other. In step 294, the system 10 tracks the determination result of step 292 for further or future analysis.

In step 296, the system 10 scores the PDF file. If the system 10 determines that the identified objects do not obscure the identified text, the system 10 determines that the PDF file is unlikely to have been altered. If the system 10 determines that one or more identified objects obscure the identified text and the system 10 further determines that the one or more identified objects are fully opaque to the identified text, the system 10 determines that the PDF file is highly likely to have been altered. If the system 10 further determines that the one or more identified objects are semi-opaque to the identified text such that the identified text can be readable and/or some text is above the one or more identified objects, the system determines that the PDF file is likely to have been altered.

In step 298, the system 10 generates a report and sends the report to the computing device 12 or other suitable computing device, or other components (e.g., the database 14, the suspicion scoring module 20*b*, or the like) of the system 10. The report can include the weight, the opinion score, the identified text and objects, the determination results from steps 290 and 292, and/or associated data. In step 300, the system 10 moves to the next PDF file to be processed.

Figure 13:
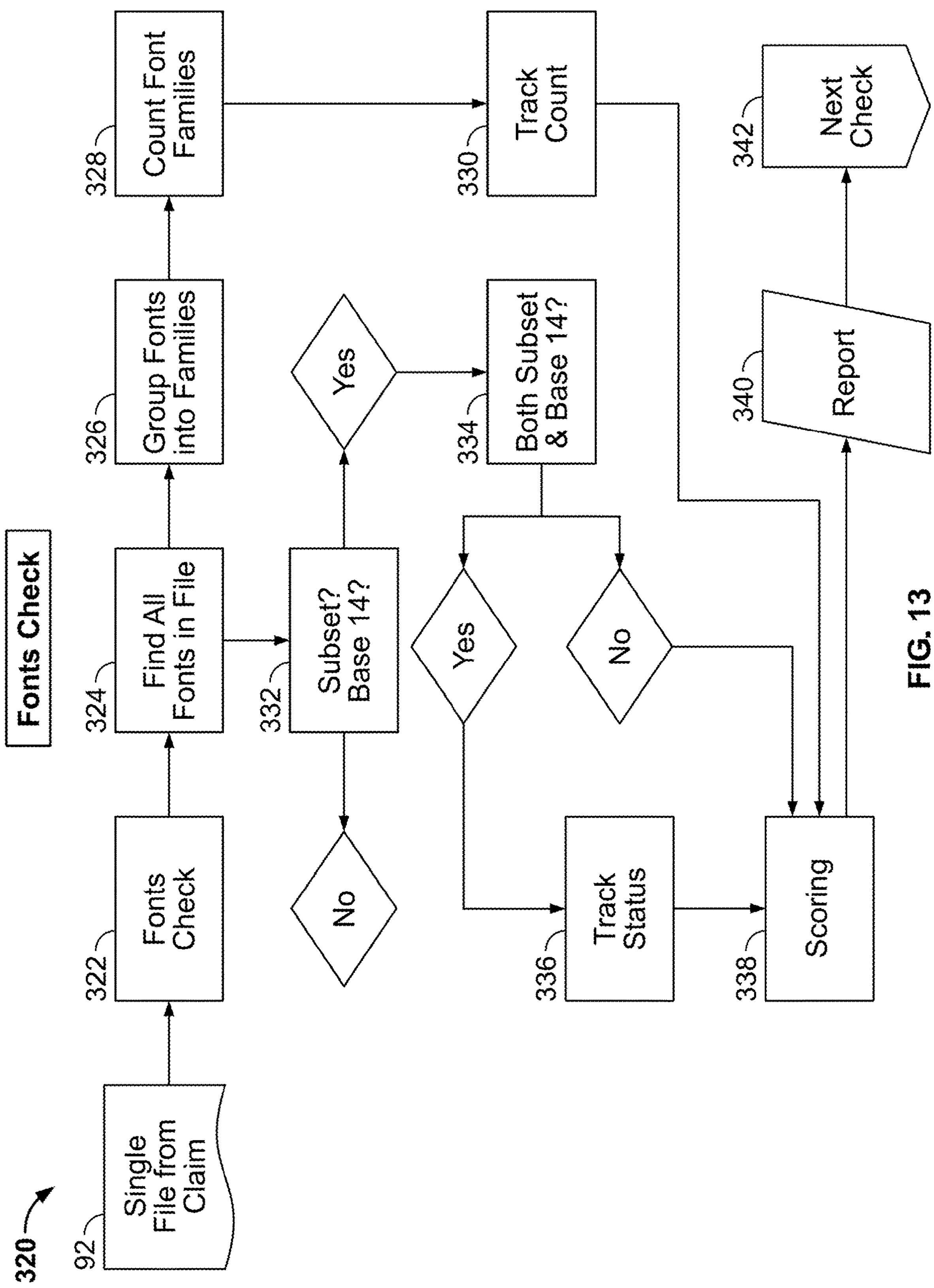
FIG. 13 is a flowchart illustrating processing steps of a font check process in greater detail.

FIG. 13 is a flowchart illustrating processing steps of a font check process in greater detail. Beginning in step 92, the system 10 receives the PDF file associated with the insurance claim, as described above. In step 322, the system 10 selects a font check process to perform. For example, the PDF file check module 20*a* selects a font check process from multiple check processes.

In step 324, the system 10 identifies all fonts used in the PDF file. For example, the system 10 can identify fonts used in the PDF file. In step 326, the system 10 groups the identified fonts into font families. For example, the system 10 groups the identified fonts having similar font attributes (e.g., size, name, weight or the like). In step 328, the system 10 counts the font families. In step 330, the system 10 tracks the number of counts and sends the number of counts to step 338 for scoring.

In step 332, the system 10 determines whether the PDF file has subset fonts and/or PDF Base 14 fonts. If the system 10 determines that the PDF file has subset fonts or Base 14 fonts, the system 10 moves to step 334.

In step 334, the system 10 determines whether the PDF file has both subset fonts and Base 14 fonts. If the system 10 determines that the PDF file has both subset fonts and Base 14 fonts, the system 10 moves to step 336 to track status of the PDF file (e.g., to indicate that the file likely has been altered due to the presence of both subset fonts and Base 14 fonts in the file). If the system 10 determines that the PDF file does not have both subset fonts and Base 14 fonts, the system 10 moves to step 338.

In step 338, the system 10 scores the PDF file. For example, if a file has too many fonts, a score is assigned indicating the file has likely been altered. If the file has a small set of fonts within the threshold and is not missing any glyphs, a different score is assigned to indicate that the file is likely unaltered. If the file has all subset and nothing extra, yet another score is assigned indicating the document is likely unaltered. If the file has both subset fonts and base 14 fonts, or if the file has any other fonts but has missing glyphs in that font, a score indicating the is assigned.

In step 340, the system 10 generates a report and sends the report to the computing device 12 or other suitable computing device, or other components (e.g., the database 14, the suspicion scoring module 20*b*, or the like) of the system 10. The report can include the weight, the opinion score, the identified fonts, font families, and subsets, the number of counts, the determination results from steps 334, the tracking results from step 336, and/or associated data. In step 342, the system 10 moves to the next PDF file to be processed.

Figure 14:
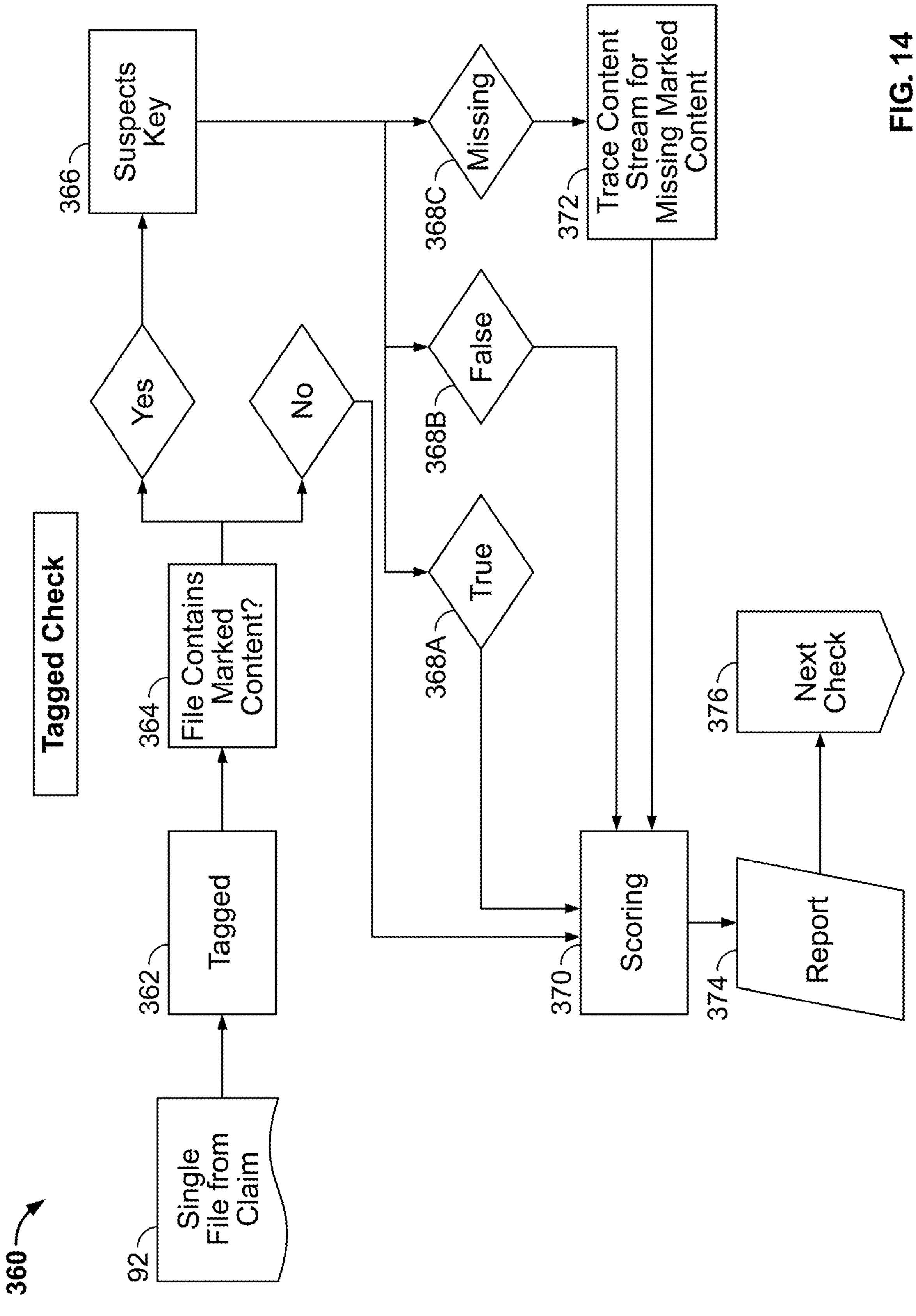
FIG. 14 is a flowchart illustrating processing steps of a tagged check process in greater detail.

FIG. 14 is a flowchart illustrating processing steps of a tagged check process 360 of step 56 in greater detail. Beginning in step 92, the system 10 receives the PDF file associated with the insurance claim, as described above. In step 362, the system 10 selects a tagged check process to perform.

In step 364, the system 10 determines whether the PDF file contains marked content. For example, the system 10 can query the marked content dictionary for a marked key. If the system 10 determines that the PDF file contains marked content (e.g., the system 10 finds the marked key), the system 10 moves to step 366. If the system 10 determines that the PDF file does not contain marked content (e.g., the system 10 does not find the Marked key and/or no BMC/BDC/EMC operators exist in the file), the system 10 moves to step 370 for scoring.

In step 366, the system 10 identifies a suspects key. For example, the system 10 can query the marked content dictionary for a suspects key. In step 368A, the system 10 determines that the value of the suspects key is true, indicating that tagging can be missing/hidden in the PDF file. The system 10 then moves to step 370 for scoring. In step 368B, the system 10 determines that the value of the suspects key is false, indicating that tagging can be accessible/visible in the PDF file. The system 10 then moves to step 370 for scoring. In step 368C, the system 10 determines that the Suspects key is missing. The system 10 then moves to step 372. In step 372, the system 10 traces content stream for missing marked content.

In step 370, the system 10 scores the PDF file. For example, following step 364, if the system 10 determines that the PDF file does not contain marked content, the system 10 applies a weight and a NULL opinion score indicating that the system 10 cannot determine with this check whether the PDF is unlikely to have been altered or not. Following step 368A, responsive to a true value for the suspects key, the system 10 assigns a weight and an opinion core indicating that the PDF is highly likely to have been altered. Following step 368B, responsive to a false value for the suspects key, the system 10 assigns a weight and a confidence core indicating that the PDF file is unlikely to have been altered. Following step 372, if the system 10 identifies that the file content is contained within BMC/BDC and EMC operators, the system 10 assigns a weight and an opinion score indicating that the PDF file is not likely to have been altered. If the system 10 determines that there is a mix of content contained within these operators, or if the content is not contained within these operators, the system 10 assigns a weight and opinion score indicating that the PDF file is suspected to have been altered.

In step 374, the system 10 generates a report and sends the report to the computing device 12 or other suitable computing device, or other components (e.g., the database 14, the suspicion scoring module 20*b*, or the like) of the system 10. The report can include the weight, the opinion score, the determination results from steps 364, values of the suspects key, tracking results from step 372, and/or associated data. In step 376, the system 10 moves to the next PDF file to be processed.

Figure 15:
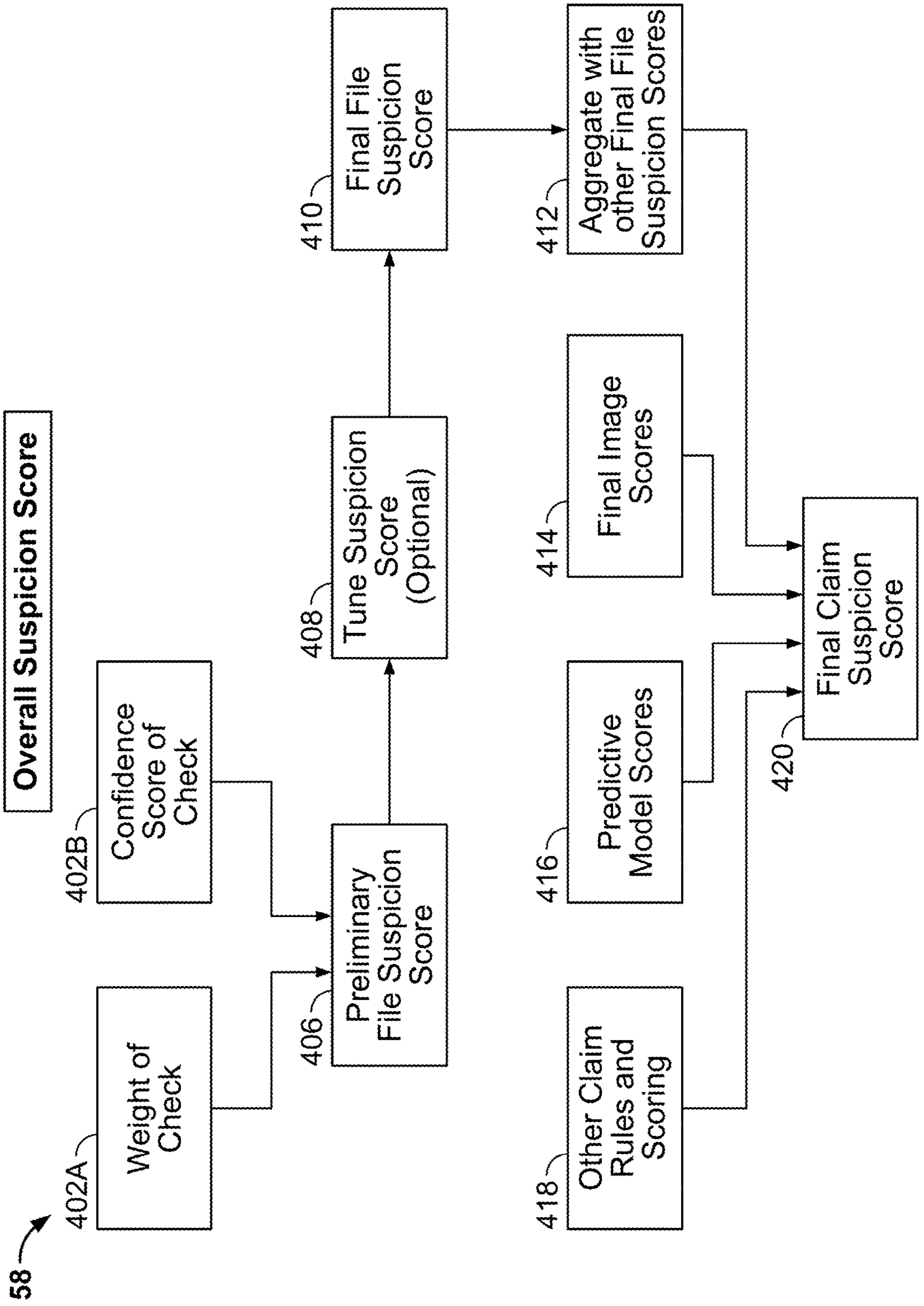
FIG. 15 is a flowchart illustrating processing steps of step 58 of FIG. 3 in greater detail.

FIG. 15 is a flowchart illustrating processing steps of step 58 in greater detail. Beginning in step 402, the system 10 receives the weight and the opinion score from each check process as described above. In step 406, the system 10 generates a preliminary file suspicion score, e.g., by multiplying the weight and the opinion score for each check process run on the PDF file and averaging the resulting values. In step 408, the system 10 tunes the preliminary file suspicion score, e.g., based on a feedback from a validation step or a further review step in which the PDF file is validated/reviewed or by user inputs, or the like. In step 410, the system 10 generates a final file suspicion score, e.g., based on the adjustments on the preliminary file suspicion score. In step 412, the system 10 aggregates with other file final file suspicion scores. For example, the system 10 retrieves historical file final file suspicion scores and/or other related file final file suspicion scores associated with the PDF file. In step 414, the system 10 determines (e.g., generates, receives, retrieves) final images scores from other processing steps, the database 14, user inputs, other computing devices, other database, the third-party system, or the like. In step 416, the system 10 determines (e.g., generates, receives, retrieves) predictive model scores from other processing steps, the database 14, user inputs, other computing devices, other database, the third-party system, or the like. In step 418, the system 10 determines (e.g., generates, receives, retrieves) other claim rules and scoring from other processing steps, the database 14, user inputs, other computing devices, other database, the third-party system, or the like. In step 420, the system 10 generates a final claim suspicion score, e.g., by combining the scores from steps 412-418. Of course, it is noted that the user can select one or any combination of the scores noted in steps 410-420, as desired.

Figure 16:
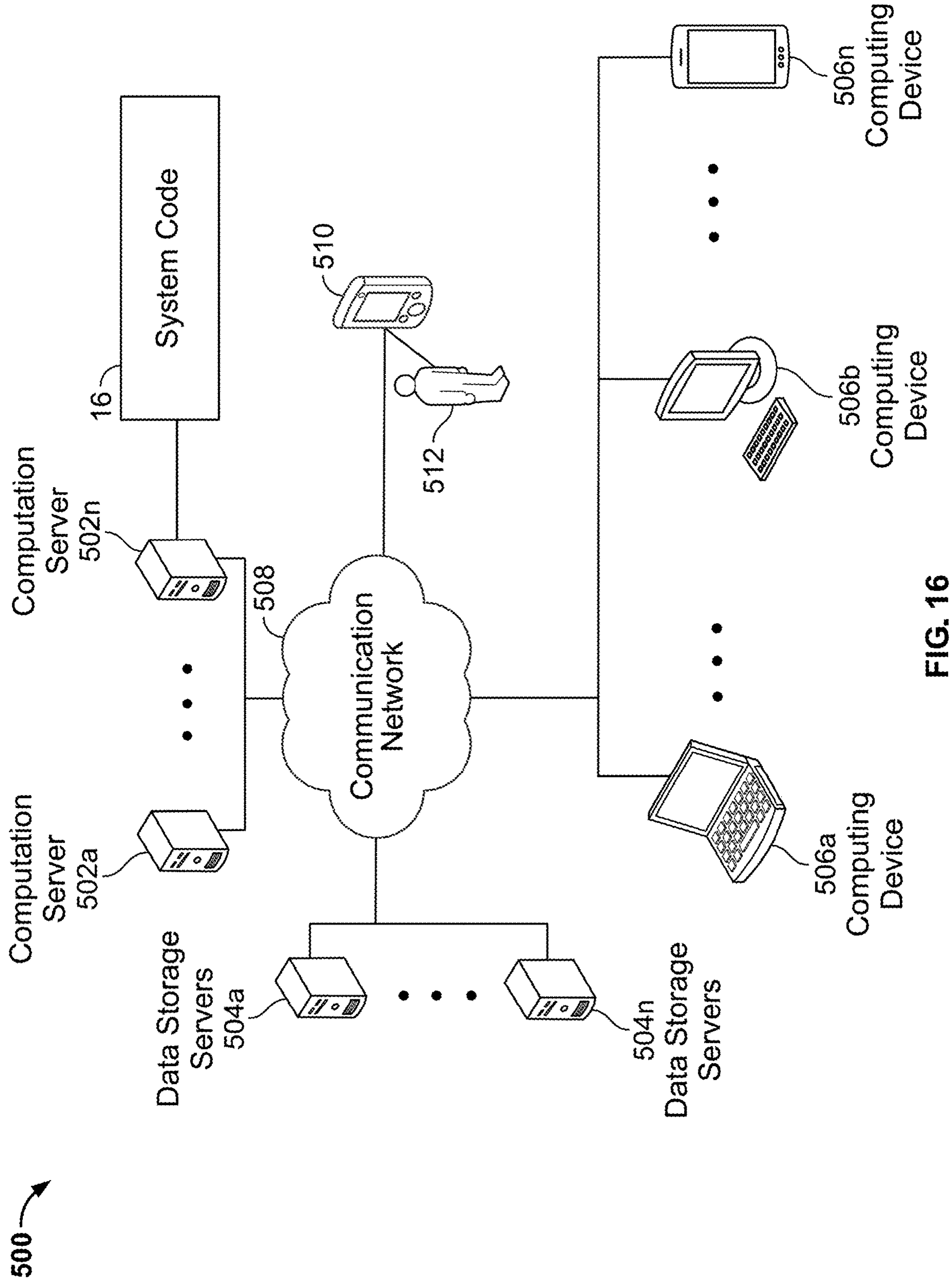
FIG. 16 is a diagram illustrating hardware and software components capable of being utilized to implement the system of the present disclosure.

FIG. 16 is a diagram illustrating computer hardware and network components on which the system 500 can be implemented. The system 500 can include a plurality of computation servers 502*a*-502*n* having at least one processor (e.g., one or more graphics processing units (GPUs), microprocessors, central processing units (CPUs), tensor processing units (TPUs), application-specific integrated circuits (ASICs), etc.) and memory for executing the computer instructions and methods described above (which can be embodied as system code 16). The system 500 can also include a plurality of data storage servers 504*a*-504*n* for storing data. A user device 510 can include, but it not limited to, a laptop, a smart telephone, and a tablet to access and/or communicate with the computation servers 502*a*-502*n* and/or data storage servers 504*a*-504*n*. The system 500 can also include remote computing devices 506*a*-506*n*. The remote computing devices 506*a*-506*n* can provide various video files. The remote computing devices 506*a*-506*n* can include, but are not limited to, a laptop 506*a*, a computer 506*b*, and a mobile device 506*n* with an imaging device (e.g., camera). The computation servers 502*a*-502*n*, the data storage servers 504*a*-504*n*, the remote computing devices 506*a*-506*n*, and the user device 510 can communicate over a communication network 508. Of course, the system 500 need not be implemented on multiple devices, and indeed, the system 500 can be implemented on a single (e.g., a personal computer, server, mobile computer, smart phone, etc.) without departing from the spirit or scope of the present disclosure.

Figure 17:
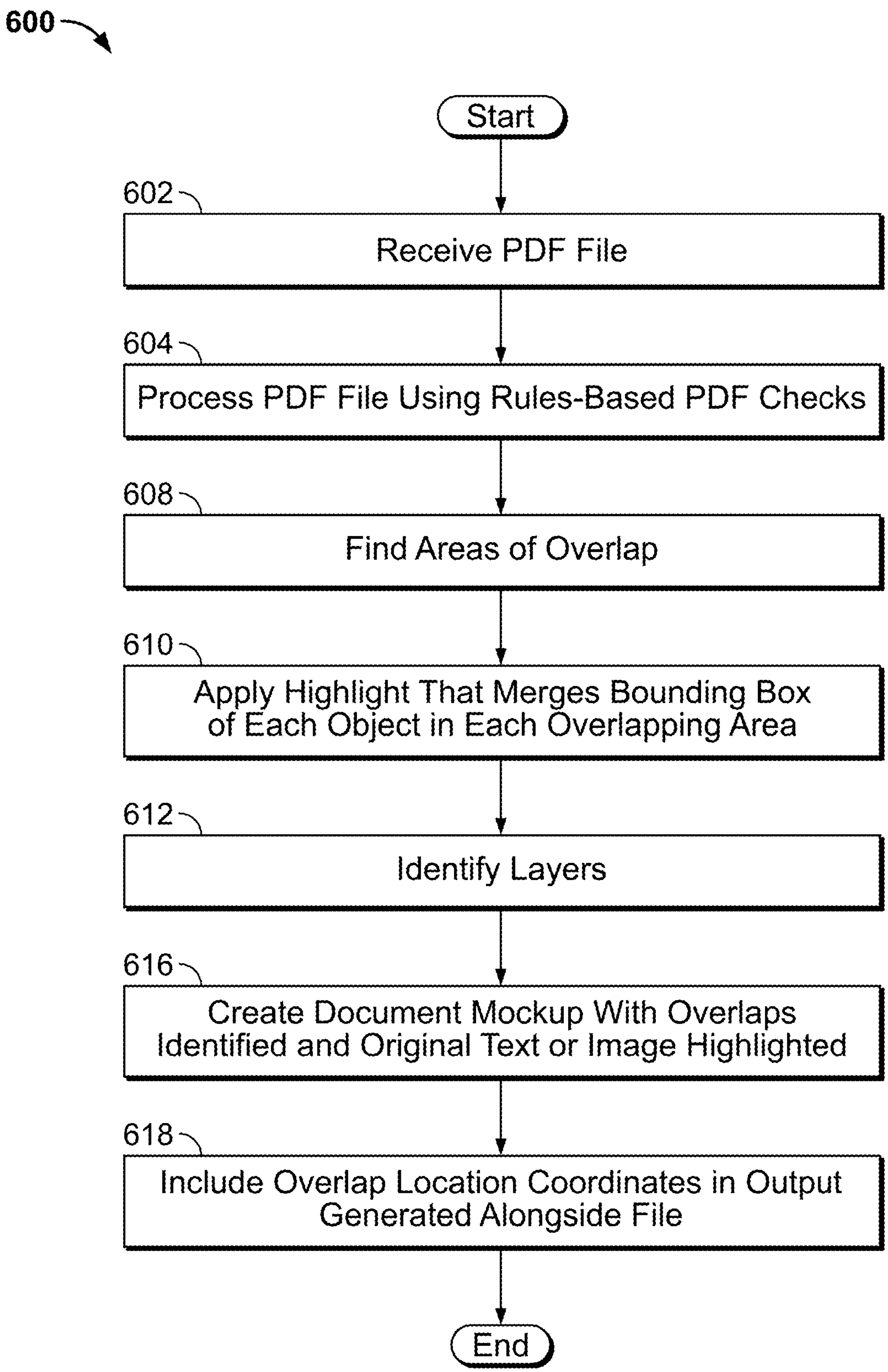
FIG. 17 is a flowchart illustrating processing steps for localizing and displaying edits to PDF files.

FIG. 17 is a flowchart illustrating processing steps, indicated generally at 600, for localizing and displaying edits to PDF files. Beginning in step 602, the system receives a PDF file to be processed. Then, in step 604, the system processes the PDF file using one or more of the rules-based PDF checks discussed herein in connection with FIGS. 1-16. Next, in step 608 the system finds an area of overlap of objects in the PDF file if the overlapping objects rules-based check (discussed above) fails. Then, step 610 occurs, wherein the system applies a highlight that merges the bounding box of each object in the overlapping area.

In step 612, the system identifies one or more layers of the PDF file (which could be actual or implied layers of the file) and any objects from the file that obscure underlying text of the file. Next, in step 616, the system creates another (mock-up) version of the file (document) wherein the overlaps are removed and the original text or image (e.g, text or image that is obscured by an object in the original file) highlighted. Finally, in step 618, the system includes overlap location coordinates in the output generated alongside the file. The mockup file can then be passed to an application programming interface (API) for use in any user interface (UI) that uses an API.

FIG. 18 is a flowchart illustrating processing steps, indicated generally at 620, for displaying multiple (e.g., previous) versions of a PDF file. In step 622, the system determines whether the PDF file was saved using an incremental save type or a full save type. Then, in step 624, for files that have incremental saves, the system reads a trailer portion of the file to find a cross-reference table or a stream. Next, in step 626, the system uses the cross-reference table or the stream to locate all objects in the document. In step 628, the system uses the generation information of each object to determine which objects(s) contain changes from the original file. Then, in step 630, the system regenerates a PDF file corresponding to each generation included in the file and adds highlighting to each change. Finally, in step 632, the system can include location coordinates (e.g., in pixel coordinates) for each change identified by the system in the regenerated PDF file. It is noted that the regenerated PDF files can then be output and/or accessed using an Application Programming Interface (API) or any other suitable access mechanism.

Figure 20:
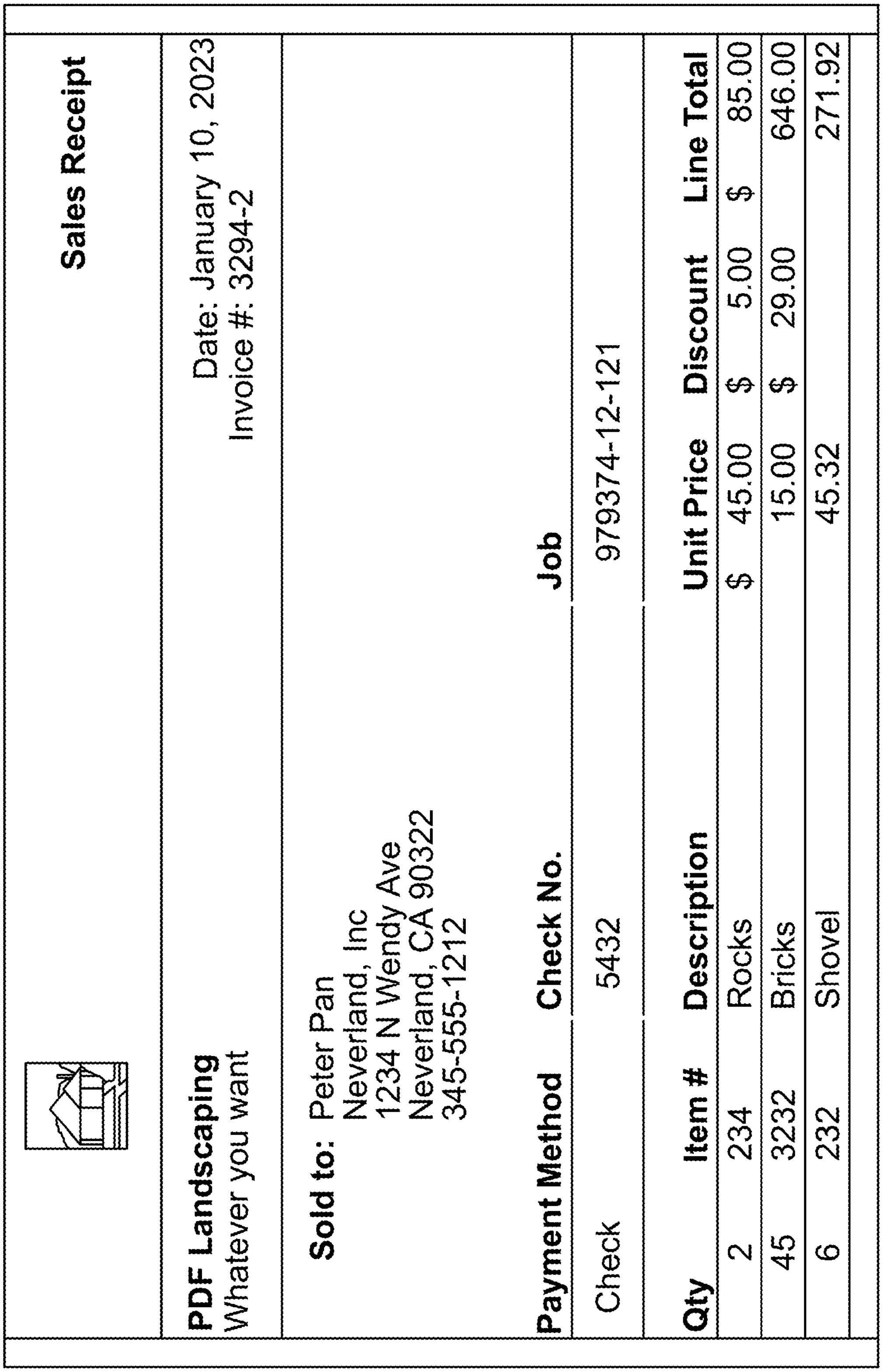

FIGS. 19-21 are screenshots illustrating localization and display by the system of edits to PDF files. Specifically, FIG. 19 is a screenshot (indicated generally at 640) of a source PDF document (prior to processing by the systems and methods of the present disclosure) that has an invisible shape placed over a portion of the document to hide text in the original document (here, the original name and address that is positioned next to the words "Sold to:" are obscured by the invisible shape). FIG. 20 illustrates a second screen shot 642 showing a regenerated PDF file, such that the original name and address information (indicated at 643) is highlighted and displayed to the user, thus localizing and displaying the change to the original PDF file. As can be appreciated, the system allows for easy localization and displaying of changes/alterations to a PDF file using the highlighting approach disclosed herein. As shown in FIG. 21, a side-by-side comparison (indicated at 644) can be generated by the system, showing the original (submitted) PDF file and a the regenerated PDF file illustrating the edits/changes that were made to the submitted PDF file. Also, as shown, additional information about the edits/changes can be displayed, such as the nature of the edit/change (here, an indication that obscured text was found by the system), coordinates of the change in the file (e.g., in pixel coordinates), an a description of the change (here, the actual hidden text).

Figure 22:
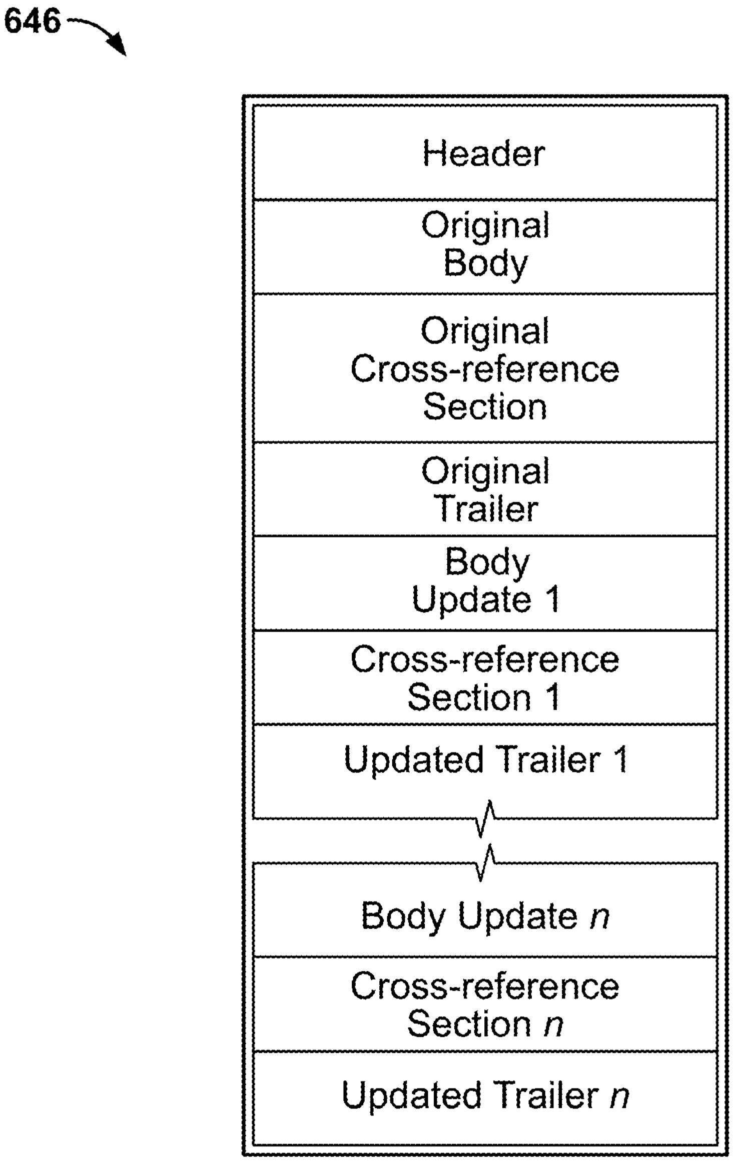
FIG. 22 is a diagram illustrating how multiple versions of a PDF file are saved in the file structure of a PDF file.

FIG. 22 is a diagram, indicated generally at 646, illustrating how multiple versions of a PDF file are saved in the file structure of a PDF file. By way of background, PDF files can be saved in two different ways: a full save (often File/Save As), which recreates the file with a whole new underlying structure, or an incremental save (often File/Save). If the file has a full save, there is no way to find previous versions of the document, because the key "breadcrumbs" (changes/additions to the file) have been overwritten. However, incremental saves append the changes to the document in a way that can be traced and, with the right code, rebuilt to show previous versions.

The system can highlight the changes between the previous and current version of the document. In documents that have had multiple incremental saves, the system can rebuild the document for each of those incremental saves. For files that are PDF version 1.4 and earlier, there is a limitation on the accuracy of these rebuilds past a few generations. This is true also of new versions of PDF, though the number of generations that can be accurately restored should be larger.

As shown in FIG. 22 (which represents the basic structure of a PDF file after an incremental save), each body update from 1 to n contains objects related to the contents and to everything drawn on the screen. Each of these objects has information about which generation of the file it is associated with. The cross reference sections 1 to n describe how to find and navigate the objects, and add information about whether each object is being used or is free. An object that is free was likely deleted in one of the generations. The trailer, among other things, contains instructions on where to find the cross reference table or stream. The system of the present disclosure strips away each of these generations, such that each generation corresponds to a version of the document. For instance, if a document has 5 generations of saves, the system will present an end user with 6 versions of the document:

Generation 5: Contains the original document (generation 0), plus each of the subsequent generations;

Generation 4: Contains all the document elements from generation 0 through 4;

Generation 3: Contains all the document elements from generation 0 through 3;

Generation 2: Contains all the document elements from generation 0 through 2;

Generation 1: Contains all the document elements from generation 0 and 1; and

Generation 0: Represents the original document

By stripping away each generation, the system can expose which edits happened in each version. Since the system can identify which objects change between versions, it can localize those changes with a highlight and coordinates, making them easy to see when displayed in a user interface (which could be similar to the one discussed above (FIGS. 19-21) for overlapping objects, but would show the documents slightly differently) discussed below in connection with FIG. 23.

FIG. 23 illustrates localization by the system of edits across multiple versions of a PDF file, indicated generally at 648. As shown in FIG. 23, the system displays a document with three generations—the original document and two subsequent saves—and localizes and displays edits/changes between each generation. These could be shown in reverse order, or they could be show with the original to the left with each successive generation to the right of that. As shown in FIG. 23, in the first generation version of the file shown in the middle of FIG. 23, a logo and an invoice number have been changed from the original version of the file shown in the right of FIG. 23. In the second generation version of the file shown in the left of FIG. 23, the "Sold to:" name and address have been changed from the first generation version of the file. This allows the system to illustrate changes in a very visual, easy-to-understand way. This allows for better judgment of whether a change to a file is normal (e.g., a normal step of a work flow), or whether it is potentially fraudulent.

While the systems and methods of the present disclosure have been described herein in connection with PDF files, it is noted that the systems and methods of the present disclosure could be applied to and/or process other document formats such as Office Open XML (docx, xlsx, pptx), OpenOffice, and LibrOoffice file types/formats, with modifications for underlying format structures and the respective document standards. Additionally, the systems and methods of the present disclosure could also operate with image files. For example, image formats such as TIFF, JPEG, JPEG 2000, PNG, GIF, etc. can be examined by the systems and methods of the present disclosure using the metadata-related methods described herein, including, but not limited to, the creation/modification dates and producer/creator checks disclosed herein.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A system for detecting manipulation of a file, comprising:

means for receiving at least one file to be analyzed; and a processor in communication with the said means, the processor programmed to:

process the at least one file using a plurality of check processes, each of the plurality of check processes generating a weight and a confidence score after processing the at least one file;

generate an overall suspicion score for the at least one file based on the weights and confidence scores generated by the plurality of check processes;

determine whether the at least one file is suspicious based on the overall suspicion score;

identify one or more areas of overlap in the at least one file;

apply a highlight to the at least one file based on bounding boxes of each object detected in each overlapping area;

identify layers in the at least one file and any objects that obscure underlying text of the at least one file; and create a document mockup with overlapping areas removed and original text or images of the at least one file highlighted.

2. The system of claim 1, wherein the plurality of check processes includes a claim date check process for checking a date of a claim indicated in the at least one file.

3. The system of claim 2, wherein the claim date check process retrieves a claim date or range, determines a creation date of the at least one file, and compares the creation date to the claim date or range.

4. The system of claim 1, wherein the plurality of check processes includes a signature check process for checking a digital signature associated with the at least one file.

5. The system of claim 1, wherein the plurality of check processes includes an encryption check process for checking encryption of the at least one file.

6. The system of claim 1, wherein the plurality of check processes includes a blocklist check processes for checking an editor used to edit the at least one file.

7. The system of claim 1, wherein the plurality of check processes includes an end-of-file and identification check process for checking at least one of an end-of-file indicator or a file identifier associated with the at least one file.

8. The system of claim 1, wherein the plurality of check processes includes a creation or modification date check process for checking at least one of a creation date or a modification date of the at least one file.

9. The system of claim 1, wherein the plurality of check processes includes a creator or producer check process for checking at least one of a creator or a producer of the at least one file.

10. The system of claim 1, wherein the plurality of check processes includes an overlapping objects check process for checking whether one or more overlapping objects exist in the at least one file.

11. The system of claim 1, wherein the plurality of check processes includes a fonts check process for checking a font associated with the at least one file.

12. The system of claim 1, wherein the plurality of check processes includes a tagged check process for checking whether the at least one file has been tagged for suspicious content.

13. The system of claim 1, wherein the processor generates overlap location coordinates for the overlapping areas.

14. The system of claim 1, wherein the processor determines whether the at least one file was saved using an incremental save or a full save.

15. The system of claim 14, wherein the processor reads a file trailer to find a cross-reference table or stream if the at least one file was saved using an incremental save.

16. The system of claim 15, wherein the processor uses the cross-reference table or stream to locate all objects in the document.

17. The system of claim 16, wherein the processor uses generation information for each object in the at least one file to determine which objects contain changes from an original version of the at least one file.

18. The system of claim 17, wherein the processor regenerates a file corresponding to each generation of the at least one file and highlights each change between each generation.

19. The system of claim 18, wherein the processor identifies location coordinates for each change.

20. A method for detecting manipulation of a file, comprising:

receiving at least one file at a processor;

processing the at least one file using a plurality of check processes, each of the plurality of check processes generating a weight and a confidence score after processing the at least one file;

generating an overall suspicion score for the at least one file based on the weights and confidence scores generated by the plurality of check processes;

determining whether the at least one file is suspicious based on the overall suspicion score;

identifying one or more areas of overlap in the at least one file;

applying a highlight to the at least one file based on bounding boxes of each object detected in each overlapping area;

identifying layers in the at least one file and any objects that obscure underlying text of the at least one file; and creating a document mockup with overlapping areas removed and original text or images of the at least one file highlighted.

21. The method of claim 20, wherein the plurality of check processes includes a claim date check process for checking a date of a claim indicated in the at least one file.

22. The method of claim 21, wherein the claim date check process retrieves a claim date or range, determines a creation date of the at least one file, and compares the creation date to the claim date or range.

23. The method of claim 20, wherein the plurality of check processes includes a signature check process for checking a digital signature associated with the at least one file.

24. The method of claim 20, wherein the plurality of check processes includes an encryption check process for checking encryption of the at least one file.

25. The method of claim 20, wherein the plurality of check processes includes a blocklist check processes for checking an editor used to edit the at least one file.

26. The method of claim 20, wherein the plurality of check processes includes an end-of-file and identification check process for checking at least one of an end-of-file indicator or a file identifier associated with the at least one file.

27. The method of claim 20, wherein the plurality of check processes includes a creation or modification date check process for checking at least one of a creation date or a modification date of the at least one file.

28. The method of claim 20, wherein the plurality of check processes includes a creator or producer check process for checking at least one of a creator or a producer of the at least one file.

29. The method of claim 20, wherein the plurality of check processes includes an overlapping objects check process for checking whether one or more overlapping objects exist in the at least one file.

30. The method of claim 20, wherein the plurality of check processes includes a fonts check process for checking a font associated with the at least one file.

31. The method of claim 20, wherein the plurality of check processes includes a tagged check process for checking whether the at least one file has been tagged for suspicious content.

32. The method of claim 20, further comprising generating overlap location coordinates for the overlapping areas.

33. The method of claim 20, further comprising determining whether the at least one file was saved using an incremental save or a full save.

34. The method of claim 33, further comprising finding a cross-reference table or stream if the at least one file was saved using an incremental save.

35. The method of claim 34, further comprising using the cross-reference table or stream to locate all objects in the document.

36. The method of claim 35, further comprising using generation information for each object in the at least one file to determine which objects contain changes from an original version of the at least one file.

37. The method of claim 36, further comprising regenerating a file corresponding to each generation of the at least one file and highlights each change between each generation.

38. The method of claim 37, further comprising identifying location coordinates for each change.

* * * * *